United States Patent
Tritschler et al.

(10) Patent No.: US 10,873,271 B2
(45) Date of Patent: Dec. 22, 2020

(54) MULTIPLE OUTPUT RECTIFIER

(71) Applicant: Wiferion GmbH, Freiburg im Breisgau (DE)

(72) Inventors: Johannes Tritschler, Freiburg (DE); Benriah Goeldi, Freiburg (DE)

(73) Assignee: Wiferion GmbH, Freiburg im Breisgau (DE)

(*) Notice: Subject to any disclaimer, the term of this patent is extended or adjusted under 35 U.S.C. 154(b) by 106 days.

(21) Appl. No.: 16/080,612

(22) PCT Filed: Feb. 28, 2017

(86) PCT No.: PCT/EP2017/054572
§ 371 (c)(1),
(2) Date: Aug. 28, 2018

(87) PCT Pub. No.: WO2017/148898
PCT Pub. Date: Sep. 8, 2017

(65) Prior Publication Data
US 2020/0144932 A1    May 7, 2020

(30) Foreign Application Priority Data
Feb. 29, 2016  (EP) .................................... 16157859

(51) Int. Cl.
*H02M 7/219*        (2006.01)
*H02M 7/06*         (2006.01)
(Continued)

(52) U.S. Cl.
CPC ........... *H02M 7/064* (2013.01); *H02M 7/217* (2013.01); *H02J 50/40* (2016.02); *H02M 7/219* (2013.01);
(Continued)

(58) Field of Classification Search
CPC combination set(s) only.
See application file for complete search history.

(56) References Cited

U.S. PATENT DOCUMENTS 4,471,423 A * 9/1984 Hase ..................... H02M 7/064
                                                    363/126
6,014,325 A    1/2000 Pecore
(Continued)

FOREIGN PATENT DOCUMENTS

| JP | H03-218265 A | 9/1991 |
| JP | 2013-176173 A | 9/2013 |

OTHER PUBLICATIONS

International Search Report dated Apr. 13, 2017 in connection with Application No. PCT/EP2017/054572.
(Continued)

*Primary Examiner* — Alex Torres-Rivera
(74) *Attorney, Agent, or Firm* — Wolf, Greenfield & Sacks, P.C.

(57) ABSTRACT

A multiple output rectifier achieving effective supply of power to a plurality of loads. The multiple output rectifier converts an AC input signal into a first rectified output signal and a second rectified output signal, wherein the AC input signal has a fundamental period dividing into a first partial period where an AC current flows in a first direction and a second partial period where the AC current flows in a second direction being a reverse direction to the first direction. The multiple output rectifier includes a first input terminal and a second input terminal different from the first input terminal for input of the AC input signal. The multiple output rectifier further includes a common output terminal, a first output terminal, and a second output terminal. The common output terminal, the first output terminal, and the second output terminal are decoupled from each other for operation in a multiple output operative mode. In the multiple output
(Continued)

operative mode and during the first partial period the multiple output rectifier is adapted to maintain polarity of the AC input signal and to transfer it to the second output terminal and the common output terminal as the first rectified output signal. Further, in the multiple output operative mode and during the second partial period the multiple output rectifier is adapted to reverse polarity of the AC input signal and to transfer it to the first output terminal and the common output terminal as the second rectified output signal. The multiple output rectifier may also comprise a switching circuit component between the first output terminal and the second output terminal to change the multiple output operative mode to a full bridge operative mode and vice versa.

15 Claims, 22 Drawing Sheets

(51) Int. Cl.
  *H02M 7/217* (2006.01)
  *H02J 50/40* (2016.01)
  *H02M 1/00* (2006.01)
(52) U.S. Cl.
  CPC .... *H02M 7/2176* (2013.01); *H02M 2001/009* (2013.01); *H02M 2001/0083* (2013.01)

(56) References Cited

U.S. PATENT DOCUMENTS

| | | | |
|---|---|---|---|
| 2003/0086280 | A1 | 5/2003 | Bourdillon |
| 2004/0257838 | A1* | 12/2004 | Gan ................. H02M 3/33592 363/21.06 |
| 2006/0152947 | A1* | 7/2006 | Baker ................. H02M 7/5387 363/16 |
| 2007/0069581 | A1 | 3/2007 | Mino |
| 2007/0120543 | A1 | 5/2007 | Caldwell |
| 2009/0309598 | A1* | 12/2009 | Zhu ....................... H02M 7/217 324/322 |
| 2014/0112043 | A1 | 4/2014 | Yamahira |

OTHER PUBLICATIONS

International Preliminary Report on Patentability for International Application No. PCT/EP2017/054572, dated Sep. 13, 2018.
Extended European Search Report for European Application No. 16157859.6, dated Oct. 7, 2016.
PCT/EP2017/054572, Sep. 13, 2018, International Preliminary Report on Patentability.
EP16157859.6, Oct. 7, 2016, Extended European Search Report.

* cited by examiner

MULTIPLE OUTPUT RECTIFIER

CROSS-REFERENCE TO RELATED APPLICATIONS

This Application is a national stage filing under 35 U.S.C. 371 of International Patent Application Serial No. PCT/EP2017/054572, filed Feb. 28, 2017, which claims priority to European application number 16157859.6 filed, Feb. 29, 2016. The entire contents of these applications are incorporated herein by reference in their entirety.

FIELD OF INVENTION

The present invention relates to a multiple output rectifier for converting an AC input signal into a first rectified output signal and a second rectified output signal.

BACKGROUND ART

A typical application of rectifiers is the field of wireless inductive power transmission. Generally, wireless inductive power transmission has several advantages over cable connected systems. Due to technological advancements, wireless inductive power transmission to mobile batteries gains increasing attention and the trend is driven by automotive, consumer, and industrial applications.

Generally, wireless inductive power transmission divides into a primary stationary side and a secondary mobile side. The primary stationary side has a switched mode electronic circuitry and a resonant circuitry consisting of capacitors and a transmission coil.

Further details of the secondary side of a wireless power transmission system are shown in FIG. 1. Here, at the secondary mobile side, a voltage and a current are induced at a receiving coil forming part of a resonant circuit. A passive or an active rectifier feeds power directly to a battery or to a mobile energy system which consists of several loads, e.g., DC/DC converters and energy storage devices such as batteries, supercaps, ultracaps, etc.

Further, as shown in FIG. 1, the secondary receiving side of a wireless inductive power transfer system comprises a rectifier and a load L1, L2 or an energy storage device E1, E2. Usually there are several energy levels used at the receiving side. However, if two loads L1, L2 or two energy storage devices E1, E2 are to be supplied with power in parallel, at least one DC/DC converter is needed to decouple the first load L1 or energy storage device E1 from the second load L2 or second energy storage device E2.

However, this implies extra circuitry leading to higher costs, weight, and circuit complexity at the secondary receiving side. Additionally, losses in DC/DC conversion lead to decreased system efficiency.

SUMMARY OF INVENTION

In view of the above, the object of the present invention is to provide a rectifier supporting effective supply of power to a plurality of loads which are connected to the secondary side of the rectifier.

According to a first aspect of the present invention this object is achieved by a multiple output rectifier for converting an AC input signal into a first rectified output signal and a second rectified output signal, wherein the AC input signal has a fundamental period dividing into a first partial period where an AC current flows in a first direction and a second partial period where the AC current flows in a second direction being a reverse direction to the first direction.

The multiple output rectifier comprises a first input terminal and a second input terminal, different from the first input terminal, for input of the AC input signal.

Further, the multiple output rectifier further comprises a common output terminal, a first output terminal, and a second output terminal. According to the present invention the common output terminal, the first output terminal, and the second output terminal are decoupled from each other.

Operatively, during the first partial period the multiple output rectifier is adapted to maintain polarity of the AC input signal and to transfer it to the second output terminal and the common output terminal as the first rectified output signal.

Further, operatively during the second partial period the multiple output rectifier is adapted to reverse polarity of the AC input signal and to transfer it to the first output terminal and the common output terminal as the second rectified output signal.

DESCRIPTION OF DRAWINGS

In the following different aspects and examples of the present invention will be explained with reference to the drawings in which.

DETAILED DESCRIPTION OF INVENTION

In the following, the present invention will be explained in detail with reference to the drawings. Here, it should be understood that such explanation is related to examples of the present invention only and not binding to the scope of the present invention as defined by the claims. As far as reference is made to specific circuit components, this is to be considered as example for the underlying functionality, where the circuit components are clearly exchangeable as long as the same functionality is achieved.

The functionality of the multiple output rectifier according to the present invention is manifold. It not only supports a multiple output type approach to rectification but also allows to configure the rectifier topology between multiple output type rectification and full bridge rectification. In addition to the multiple output rectifier according to the present invention allows to control the amount of power delivered to loads at the output side and to implement an exchange of energy between energy storages connected to the multiple outputs.

In the following, the present invention will be explained using generic terminology to avoid restriction of the scope of protection. Here, a rectifier circuit component may be any suitable type of circuitry having a current valve functionality, e.g., a diode or an active switch like a relay, a MOSFET, a IGBT or any other switching type semiconductor device.

Figure 1:
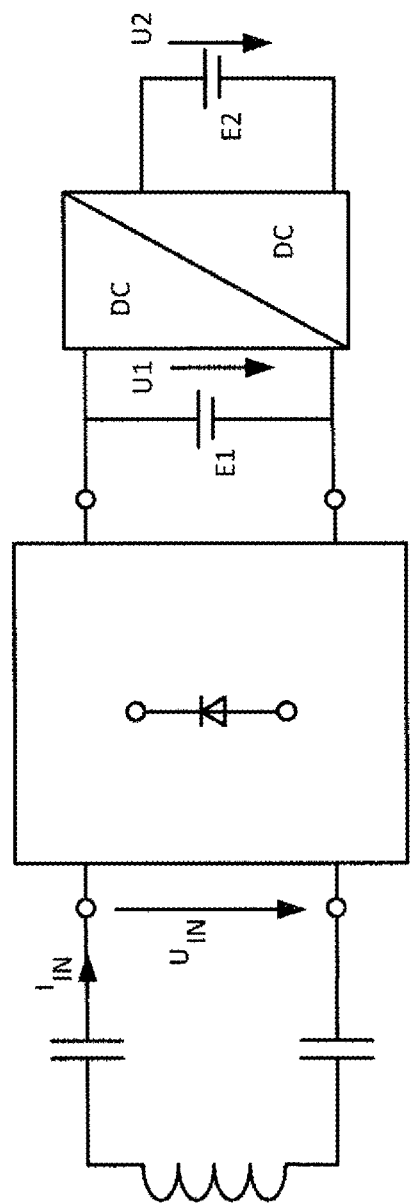
FIG. 1 shows a secondary side of a wireless power transmission system according to the state of the art.
Figure 2:
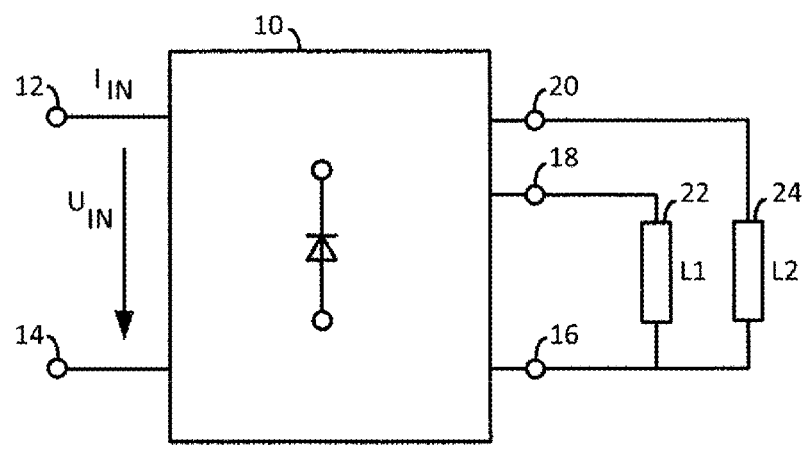
FIG. 2 shows an IO circuit topology of a multiple output rectifier according to a first example of the present invention.

FIG. 2 shows an IO circuit topology of a multiple output rectifier 10 according to a first example of the present invention.

As shown in FIG. 2, the multiple output rectifier 10 according to the first example of the present invention has a first input terminal 12 and a second input terminal 14 being different from the first input terminal for input of the AC input signal having current $I_{IN}$ and voltage $U_{IN}$.

As shown in FIG. 2, the multiple output rectifier 10 according to the first example of the present invention has an IO circuit topology such that a first common output terminal 16, a first output terminal 18, and a second output terminal 20 are decoupled from each other.

As shown in FIG. 2, operatively the multiple output rectifier 10 of the first example according to the present invention allows for a simultaneous, parallel and direct connection of a first load 22 to the first output terminal 18 and the first common output terminal 16 and of a second load 24 to the second output terminal 20 and the first common output terminal 16.

It should be understood that according to the present invention the term load may not be construed in limiting or binding manner. Here, a load may be any device for storage of electric energy or any consumer of electric energy.

Operatively, the multiple output rectifier 10 according to the first example of the present invention supports a direct connection of the first load 22 and a related supply of a rectified signal to the first load 22. At the same time the multiple output rectifier 10 according to the first example of the present invention supports a parallel and direct connection of the second load 24 and a related supply of a rectified signal to the second load 24.

Thus, according to the present invention the multiple output rectifier 10 according to the first example of the present invention allows for output of rectified signals to different loads 22, 24 such that both loads 22, 24 are supplied with power in parallel and without provision of additional circuitry, e.g., a DC/DC converter as in the prior art.

Figure 3:
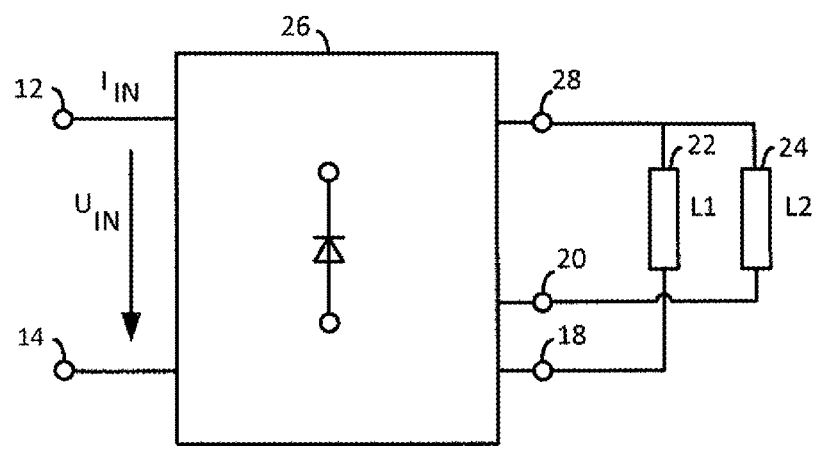
FIG. 3 shows an IO circuit topology of a multiple output rectifier according to a second example of the present invention.

FIG. 3 shows an IO circuit topology of a multiple output rectifier 26 according to a second example of the present invention.

As shown in FIG. 3, the multiple output rectifier 26 according to the second example of the present invention differs from the multiple output rectifier 10 according to the first example of the present invention in the arrangement of the common output terminal. While according to the first example the first common output terminal 16 is the lower output terminal according to the second example a second common output terminal 28 it is an upper output terminal.

As shown in FIG. 3, the multiple output rectifier 26 according to the second example of the present invention has the first input terminal 12 and the second input terminal 14 being different from the first input terminal 12 for input of the AC input signal having current $I_{IN}$ and voltage $U_{IN}$.

As shown in FIG. 3, the multiple output rectifier 26 according to the second example of the present invention has an IO circuit topology such that the second common output terminal 28, the second output terminal 20, and the first output terminal 18 are decoupled from each other, e.g., by galvanic decoupling.

As shown in FIG. 3, operatively the multiple output rectifier 26 according to the second example of the present invention allows for a simultaneous, parallel and direct connection of the first load 22 to the second common terminal 28 and the first output terminal 18 and of the second load 24 to the second common output terminal 28 and the second output terminal 20.

Operatively, the multiple output rectifier 26 according to the second example of the present invention supports a direct connection of the first load 22 and a related supply of a rectified signal to the first load 22. At the same time the multiple output rectifier 26 according to the second example of the present invention supports a parallel and direct connection of the second load 24 and a supply of a rectified signal to the second load 24.

Thus, according to the present invention the multiple output rectifier 26 according to the second example of the present invention allows for output of rectified signals to the first load 22 and to the second load 24 such that both loads 22, 24 are supplied with power in parallel and without provision of additional circuitry, e.g., a DC/DC converter as in the prior art.

Figure 2A:
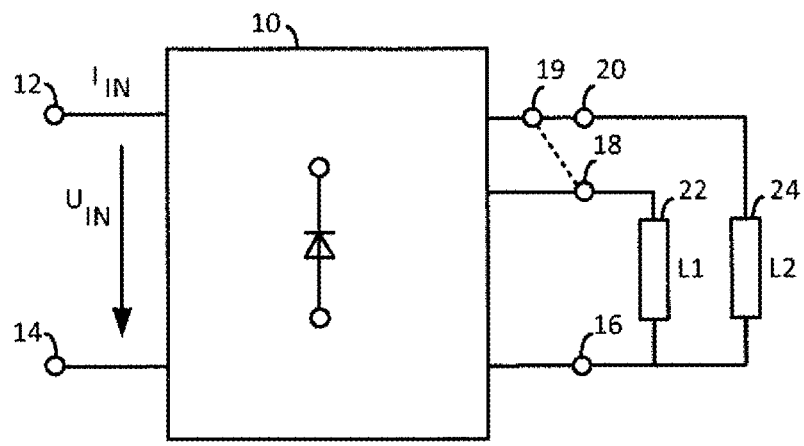
FIG. 2a shows an IO circuit topology of a multiple output rectifier according to a modification of the first example of the present invention shown in FIG. 2.

FIG. 2a shows an IO circuit topology of a multiple output rectifier 10 according to a modification of the first example of the present invention shown in FIG. 2.

As shown in FIG. 2a, the multiple output rectifier according to a modification of the first example of the present invention comprises a first switching circuit component 19 which is configured to open the connection between the second output 20 and the rectifier 10 to connect the first output 18 according to a full bride operative mode.

As shown in FIG. 2a, the first switching circuit component 19 is provided between the multiple output rectifier 10 and the second output terminal 20 and the first output terminal 18, respectively.

Operatively, the first switching circuit component 19 is adapted to change the operative mode of the multiple output rectifier 10 from the multiple output operative mode to a full bridge operative mode and vice versa.

Figure 2B:
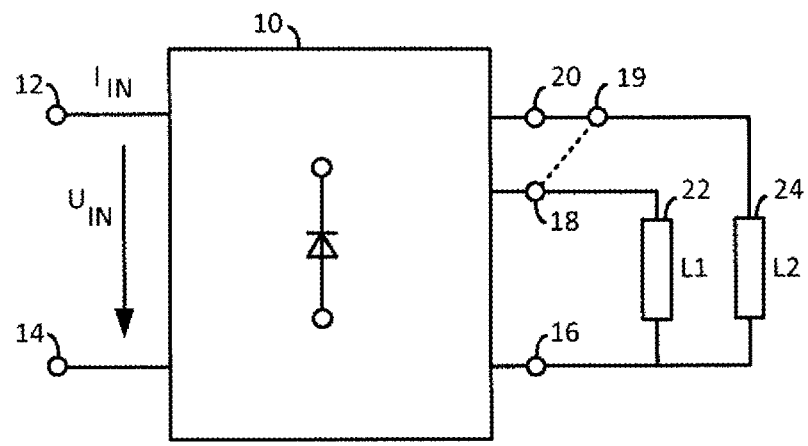
FIG. 2b shows an IO circuit topology of a multiple output rectifier according to a further modification of the first example of the present invention shown in FIG. 2.

FIG. 2b shows an IO circuit topology of a multiple output rectifier 10 according to a further modification of the first example of the present invention shown in FIG. 2.

The further modification shown in FIG. 2b differs over the one shown in FIG. 2a in that first switching circuit component 19 is provided subsequent to the second output terminal 20 and the first output terminal 18, respectively.

Further, it should be noted that FIGS. 2a and 2b show examples where the first switching circuit component 19 is provided in the upper branch connecting the multiple output rectifier 10 and the second output terminal 20. As further alternatives the first switching circuit component 19 may provided in the lower branch connecting the multiple output rectifier 10 and the first output terminal 18.

Figure 3A:
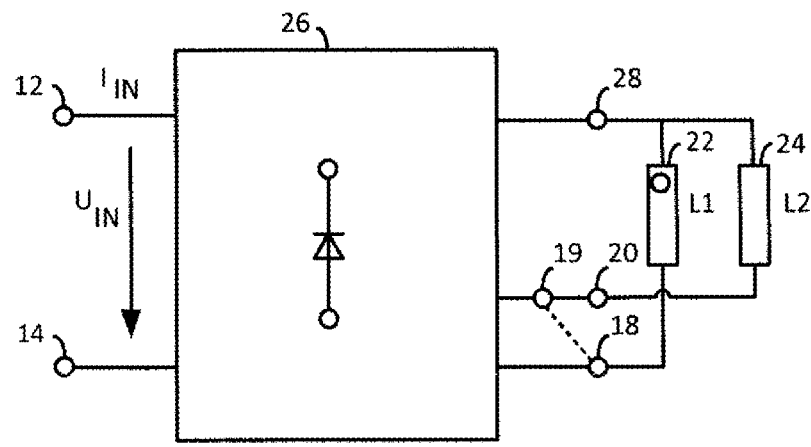
FIG. 3a shows an IO circuit topology of a multiple output rectifier according to a modification of the second example of the present invention shown in FIG. 3.

FIG. 3a shows an IO circuit topology of a multiple output rectifier 26 according to a modification of the second example of the present invention shown in FIG. 3.

As shown in FIG. 3a, the multiple output rectifier 26 according to a modification of the second example of the present invention comprises the first switching circuit component 19 provided between the first output terminal 18 and the second output terminal 20.

As shown in FIG. 3a, the first switching circuit component 19 is provided between the multiple output rectifier 26 and the second output terminal 20 and the first output terminal 18, respectively.

Operatively, the first switching circuit component 19 is adapted to open the connection between the second output terminal 20 and the multiple output rectifier 26 to connect the first output terminal 18 according to a full bridge operative mode.

Figure 3B:
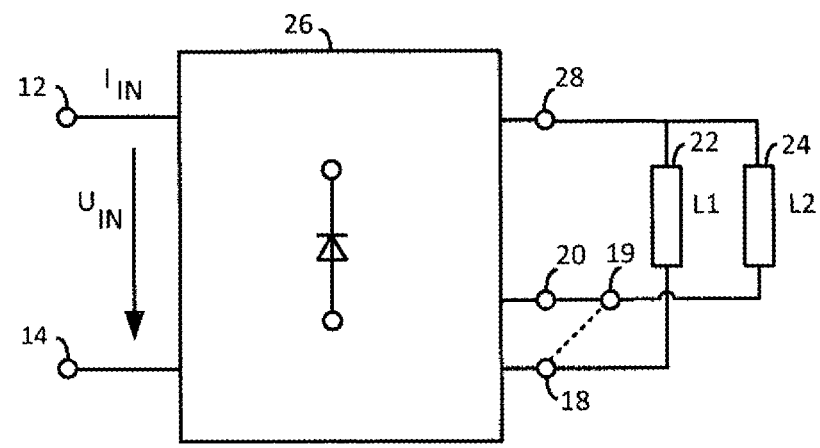
FIG. 3b shows an IO circuit topology of a multiple output rectifier according to a further modification of the second example of the present invention shown in FIG. 3.

FIG. 3b shows an IO circuit topology of a multiple output rectifier 26 according to a further modification of the second example of the present invention shown in FIG. 3.

The further modification shown in FIG. 3b differs over the one shown in FIG. 3a in that first switching circuit component 19 is provided subsequent to the second output terminal 20 and the first output terminal 18, respectively.

Further, it should be noted that FIGS. 3a and 3b show examples where the first switching circuit component 19 is provided in the upper branch connecting the multiple output rectifier 26 and the second output terminal 20. As further alternatives the first switching circuit component 19 may be provided in the lower branch connecting the multiple output rectifier 26 and the first output terminal 18.

According to the present invention the switching between the multiple output operative mode and the full bridge operative mode and vice versa achieves increased flexibility during rectification operation. Due to the switching element 19, the load current of each of the loads L1 and L2 can be controlled. In the multiple output operative mode the load current is distributed between the loads L1 and L2 depending on the duty cycle of the switching, e.g., distributed equally between the loads L1 and l2. Otherwise, in the full bridge operative mode the full load current is supplied to only one of the two loads L1 and L2.

Figure 4:
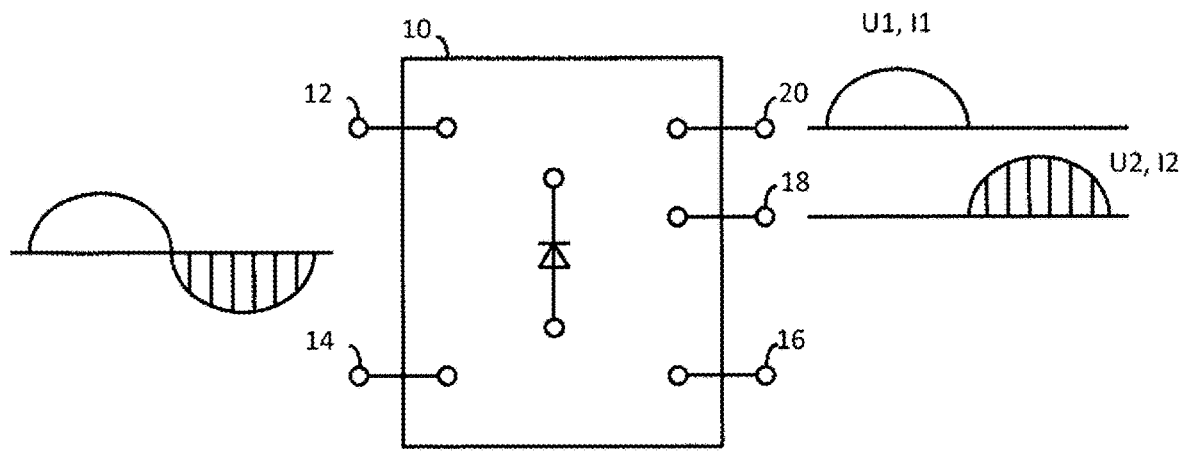
FIG. 4 shows an IO transfer functionality of the multiple output rectifier according to the first example of the present invention as shown in FIG. 2, FIG. 2a, or FIG. 2b.

FIG. 4 shows an IO transfer functionality of the multiple output rectifier 10 according to the first example of the present invention as shown in FIG. 2.

Here, although not shown in FIG. 4, the first switching circuit component 19 for changing from the multiple output operative mode to the full bridge operative mode and vice versa may be provided at the output side of the multiple output rectifier 10 in the sense outlined above with respect to FIGS. 2a and 2b. If so, the function thereof is similar to the one explained with respect to FIGS. 2a and 2b and its related explanation is not repeated here.

As shown in FIG. 4, according to the present invention the input signal is an AC input signal that has a fundamental period dividing into a first partial period where an AC current $I_{IN}$ flows in a first direction and a second partial period where the AC current flows $I_{IN}$ in a second direction being a reverse direction to the first direction. It should be noted that the AC input signal is not restricted to a specific type of signal, e.g., a sinus signal, a trapezoidal signal or a saw tooth signal.

As shown in FIG. 4, in a first operative state the multiple output rectifier 10 according to the first example of the present invention is adapted to maintain polarity of the AC input signal and to transfer it to the second output terminal 20 and the first common output terminal 16 as a first rectified output signal $I_1$, $U_1$ during the first partial period.

As shown in FIG. 4, in a second operative state the multiple output rectifier 10 according to the first example of the present invention is adapted to reverse polarity of the AC input signal and to transfer it to the first output terminal 18 and the first common output terminal 16 as the second rectified output signal $I_2$, $U_2$ during the second partial period.

Figure 5:
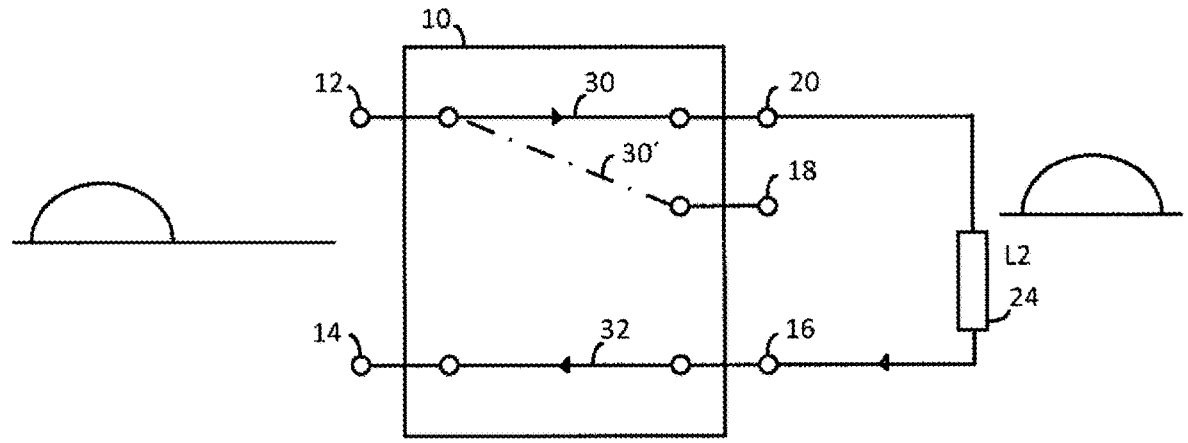
FIG. 5 shows a signal flow diagram according to a first operative state of the multiple output rectifier according to the first example of the present invention as shown in FIG. 4.

FIG. 5 shows a signal flow diagram according to a first operative state of the multiple output rectifier 10 according to the first example of the present invention as shown in FIG. 4.

As shown in FIG. 5, in the first operative state during the first partial period the multiple output rectifier 10 according to the first example of the present invention is adapted to establish a first current path 30 from the first input terminal 12 to the second output terminal 20 and to establish a second current path 32 from the first common output terminal 16 to the second input terminal 14 for output of the first rectified output signal $U_1$, $I_1$ from the second output terminal 20 to the first common output terminal 16.

It should be noted that the particular order on the first output terminal 18 and the second output terminal 20 is non-binding to the scope of protection of the present invention. As shown in FIG. 5, upon reversion of this order the modified first current path 30' shown with a dot-dash line would be applicable.

Figure 6:
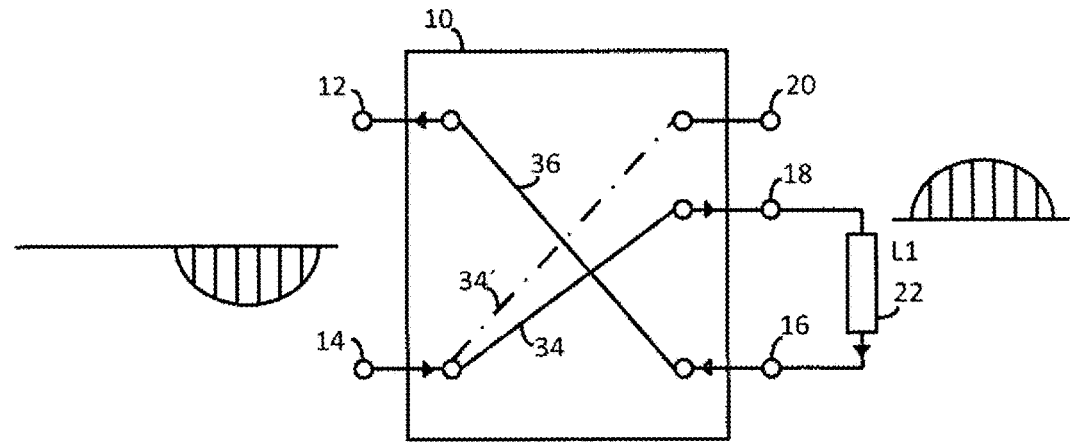
FIG. 6 shows a signal flow diagram according to a second operative state of the multiple output rectifier according to the first example of the present invention as shown in FIG. 4.

FIG. 6 shows a signal flow diagram according to a second operative state of the multiple output rectifier 10 according to the first example of the present invention as shown in FIG. 4.

As shown in FIG. 6, in the second operative state during the second partial period the multiple output rectifier 10 according to the first example of the present invention is adapted to establish a third current path 34 from the second input terminal 14 to the first output terminal 18 and to establish a fourth current path 36 from the first common output terminal 16 to the first input terminal 12 for output of the second rectified output signal $U_2$, $I_2$ from the first output terminal 18 to the first common output terminal 16.

It should be noted that the particular order on the first output terminal 18 and the second output terminal 20 is non-binding to the scope of protection of the present invention. As shown in FIG. 6, upon reversion of this order the modified third current path 34' shown with a dot-dash line would be applicable.

Figure 7:
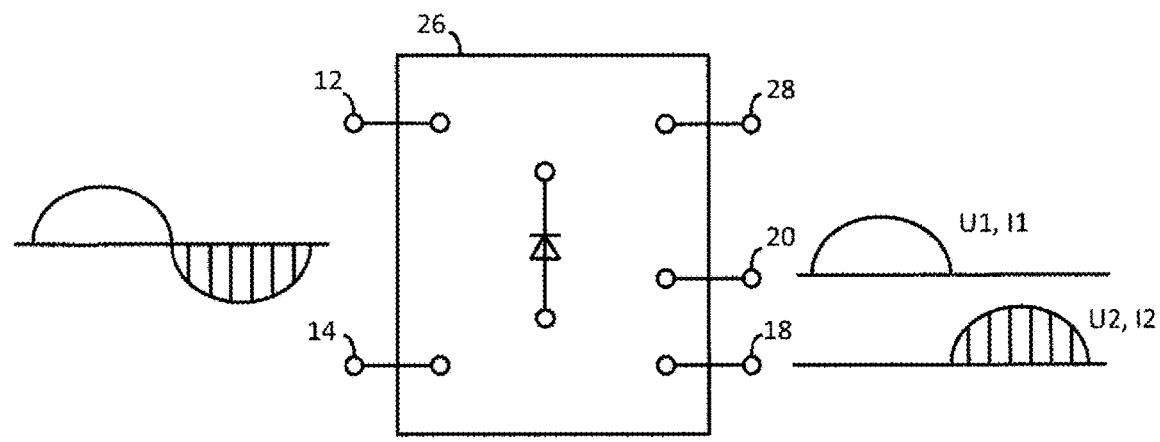
FIG. 7 shows an IO transfer functionality of the multiple output rectifier according to the second example of the present invention as shown in FIG. 3, FIG. 3a, or FIG. 3nb.

FIG. 7 shows an IO transfer functionality of the multiple output rectifier 26 according to the second example of the present invention as shown in FIG. 3.

Here, although not shown in FIG. 7, the first switching circuit component 19 for changing from the multiple output operative mode to the full bridge operative mode and vice versa may be provided at the output side of the multiple output rectifier 26 in the sense outlined above with respect to FIGS. 3a and 3b. If so, the function thereof is similar to the one explained with respect to FIGS. 3a and 3b and its related explanation is not repeated here.

With respect to the input signal AC the same explanations as given above with respect to multiple output rectifier 10 according to the first example of the present invention and FIG. 4 also apply and therefore are not repeated here.

As shown in FIG. 7, in a first operative state the multiple output rectifier 26 according to second example of the present invention is adapted to maintain polarity of the AC input signal and to transfer it to the second common output terminal 28 and the second output terminal 20 as the first rectified output signal $I_1$, $U_1$ during the first partial period.

As shown in FIG. 7, in a second operative state the multiple output rectifier 26 according to the second example of the present invention is adapted to reverse polarity of the AC input signal and to transfer it to the second common terminal 28 and the first output terminal 18 as the second rectified output signal $I_2$, $U_2$ during the second partial period.

Figure 8:
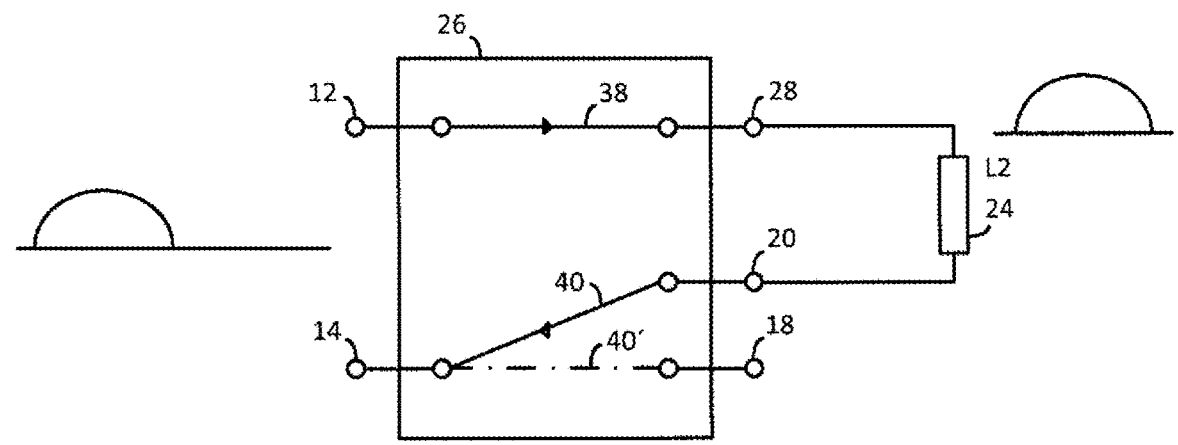
FIG. 8 shows a signal flow diagram according to a first operative state of the multiple output rectifier according to the second example of the present invention as shown in FIG. 6.

FIG. 8 shows a signal flow diagram according to a first operative state of the multiple output rectifier 26 according to the second example of the present invention as shown in FIG. 3.

As shown in FIG. 8, in the first operative state during the first partial period the multiple output rectifier 26 according to the second example of the present invention is adapted to establish a fifth current path 38 from the first input terminal 12 to the second common output terminal 28 and to establish a sixth current path 40 from the second output terminal 20 to the second input terminal 14 for output of the first rectified output signal $I_1$, $U_1$ from the second common output terminal 28 to the second output terminal 20.

It should be noted that the particular order on the first output terminal 18 and the second output terminal 20 is non-binding to the scope of protection of the present invention. As shown in FIG. 8, upon reversion of this order the modified sixth current path 40' shown with a dot-dash line would be applicable.

Figure 9:
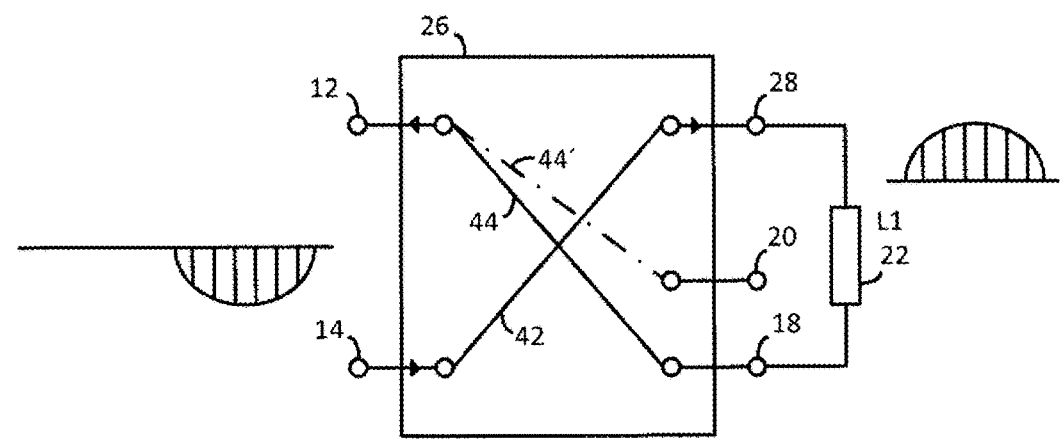
FIG. 9 shows a signal flow diagram according to a second operative state of the multiple output rectifier according to the second example of the present invention as shown in FIG. 6.

FIG. 9 shows a signal flow diagram according to a second operative state of the multiple output rectifier 26 according to the second example of the present invention as shown in FIG. 3.

As shown in FIG. 9, in the second operative state during the second partial period the multiple output rectifier 26 according to the second example of the present invention rectifier is adapted to establish a seventh current path 42 from the second input terminal 14 to the second common output terminal 28 and to establish an eighth current path 44 from the first output terminal 18 to the first input terminal 12 for output of the second rectified output signal $I_2$, $U_2$ from the second common output terminal 28 to the first output terminal 18.

It should be noted that the particular order on the first output terminal 18 and the second output terminal 20 is non-binding to the scope of protection of the present invention. As shown in FIG. 9, upon reversion of this order the modified eighth current path 44' shown with a dot-dash line would be applicable.

Figure 10:
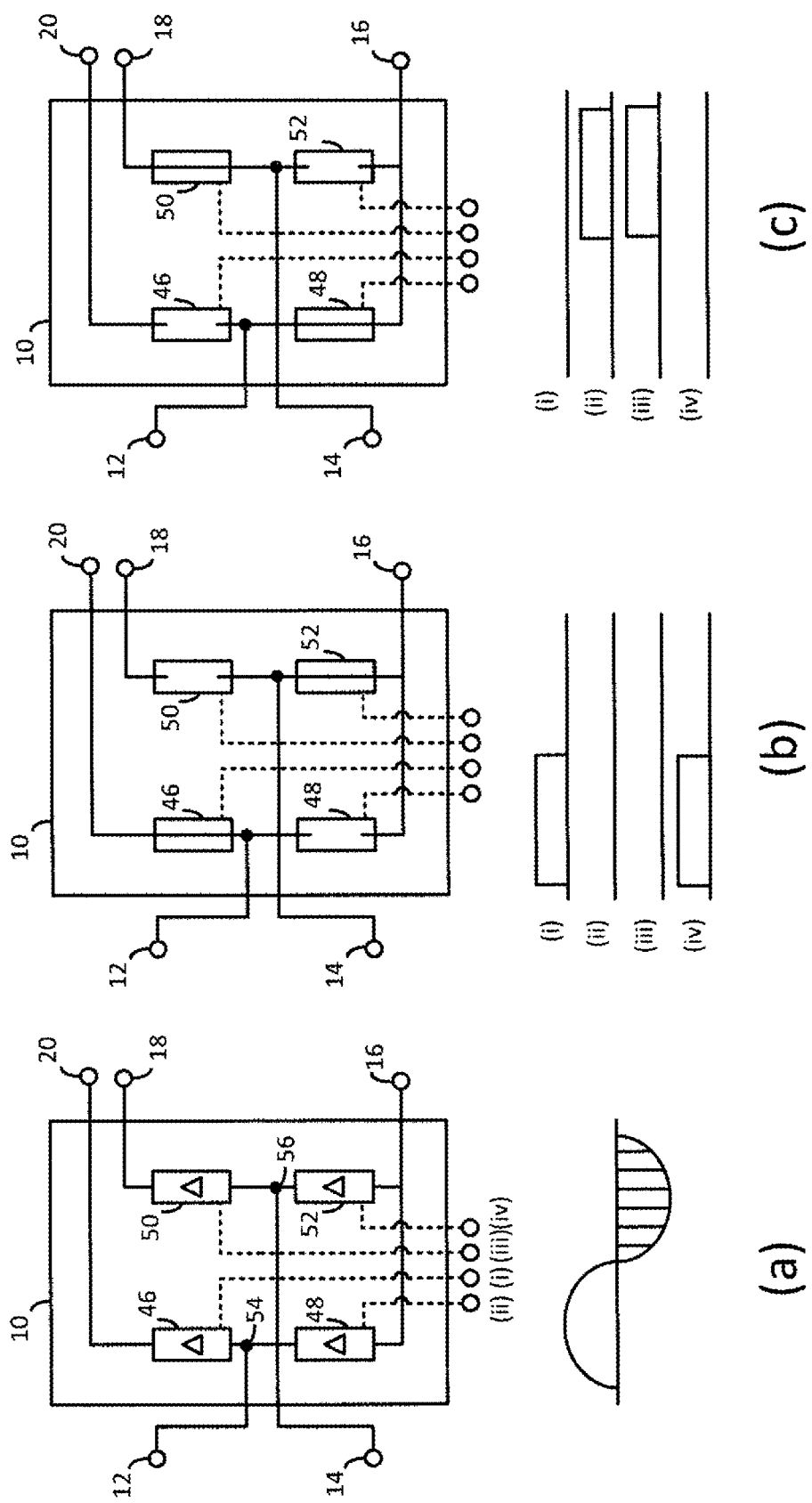
FIG. 10 shows a schematic circuit diagram of the multiple output rectifier according to the first example of the present invention realizing a signal flow as shown in FIG. 5 and FIG. 6.

FIG. 10 shows a schematic circuit diagram of the multiple output rectifier 10 according to the first example of the present invention realizing a signal flow as shown in FIG. 5 and FIG. 6.

As shown in FIG. 10, the multiple output rectifier 10 according to the first example of the present invention comprises a first rectifying circuit component 46 adapted to act as current valve in the direction from its input to its output, a second rectifying circuit component 48 adapted to act as current valve in the direction from its input to its output, a third rectifying circuit component 50 to act as current valve in the direction from its input to its output, and a fourth rectifying circuit component 52 adapted to act as current valve in the direction from its input to its output.

As shown in FIG. 10, the output of the second rectifying circuit component 48 is connected in series to the input of the first rectifying circuit component 46 forming a first intermediate network node 54. The output of the fourth rectifying circuit component 52 is connected in series to the input of the third rectifying circuit component 50 forming a second intermediate network node 56.

As shown in FIG. 10, the first input terminal 12 is connected to the first intermediate network node 54. The second input terminal 14 is connected to the second intermediate network node 56. The output of the first rectifying circuit component 46 is connected to the second output terminal 20. The output of the third rectifying circuit component 50 is connected to the first output terminal 18. The input of the second rectifying circuit component 48 is connected to the first common output terminal 16. The input of the fourth rectifying circuit component 52 is connected to the first common output terminal 16.

Operatively, as shown in FIG. 10(b) the multiple output rectifier 10 according to the first example of the present invention configures in the first operative state corresponding to the first partial period of the AC input signal the first current path from the first input terminal 12 to the second output terminal 20 over the first rectifying circuit component 46. Also, the second current path from the first common output terminal 16 to the second input terminal 14 is configured to pass the fourth rectifying circuit component 52.

Further, operatively as shown in FIG. 10(c) during the second partial period of the AC input signal the multiple output rectifier 10 according to the first example of the present invention reverses current flow to the second rectifying circuit component 48 and the fourth rectifying circuit component 50 to establish the third current path and the fourth current path explained with respect to FIG. 6.

As shown in FIG. 10, should the rectifying circuit components be active switches, then the control signals (i), (ii), (iii), and (iv) are applied to the rectifying circuit components 46, 48, 50 and 52, respectively.

Figure 11:
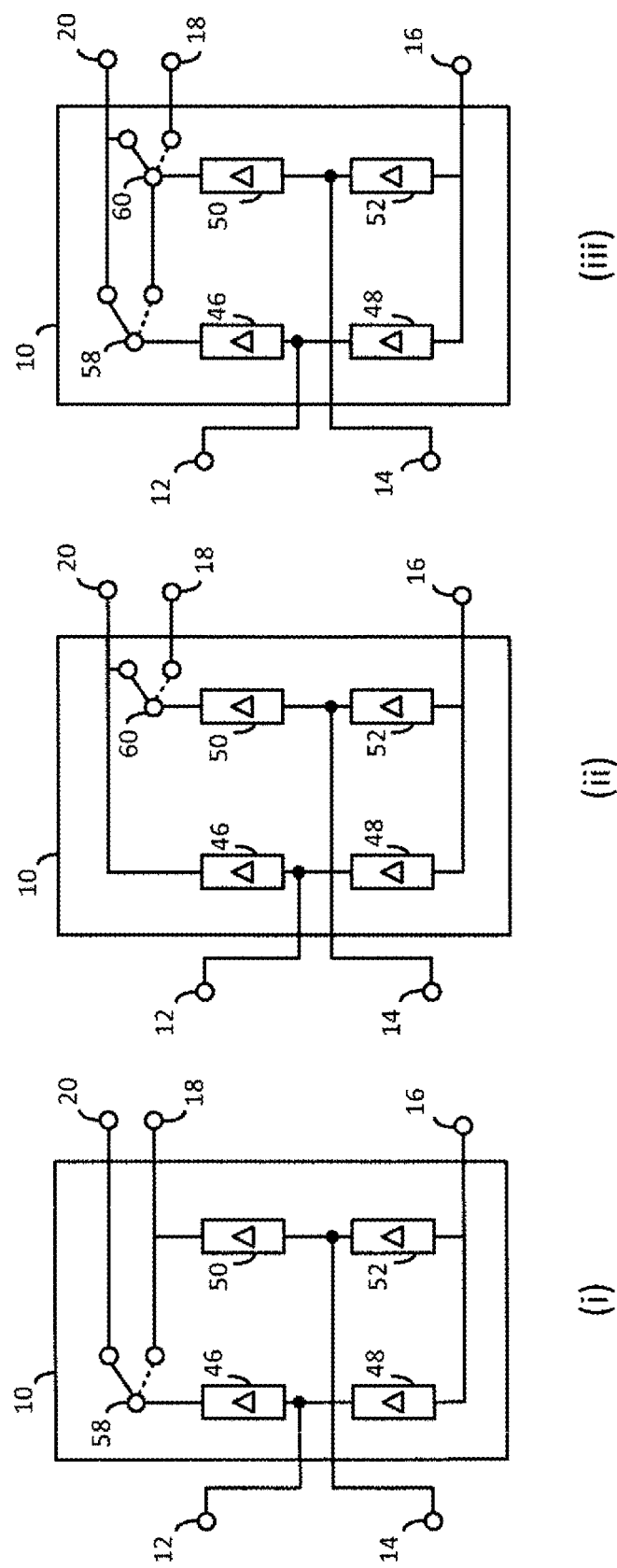
FIG. 11 shows a schematic circuit diagram corresponding to the multiple output rectifier according to the first example of the present invention having functionality to switch between a multiple output rectifying mode and a full bridge rectifying mode.

FIG. 11 shows a schematic circuit diagram corresponding to the multiple output rectifier 10 according to the first example of the present invention having functionality to switch between a multiple output rectifying mode and a full bridge rectifying mode and having functionality to control power delivered to the output terminals.

As shown in FIG. 11(i), the multiple output rectifier 10 according to the first example of the present invention preferably comprises a first switching circuit component 58 adapted to switch a connection between the output of the first rectifying circuit component 46 and the second output terminal 20 according to a multiple output operative mode to a connection between the output of the first rectifying circuit component 46 and the first output terminal 12 according to a full bridge operative mode.

As shown in FIG. 11(ii), the multiple output rectifier 10 according to the first example of the present invention preferably comprises a second switching circuit component 60 adapted to switch a connection between the output of the third rectifying circuit component 50 and the second output terminal 20 according to a full bridge operative mode to a connection between the output of the third rectifying circuit component 50 and the first output terminal 18 according to a multiple output operative mode.

As shown in FIG. 11(iii), the multiple output rectifier 10 according to the first example of the present invention preferably comprises the first switching circuit component 58 and the second switching circuit component 60 in combination.

Operatively, the different switching constellations lead to the following rectifier constellations:

| Switch 58 | Switch 60 | Functionality |
| --- | --- | --- |
| output terminal 20 | output terminal 18 | multiple output |
| output of rectifying circuit component 50 | output terminal 18 | full bridge output terminal 18 |
| output terminal 20 | output terminal 20 | full bridge output terminal 20 |
| output of rectifying circuit component 50 | output terminal 20 | full bridge output terminal 20 |

Figure 12:
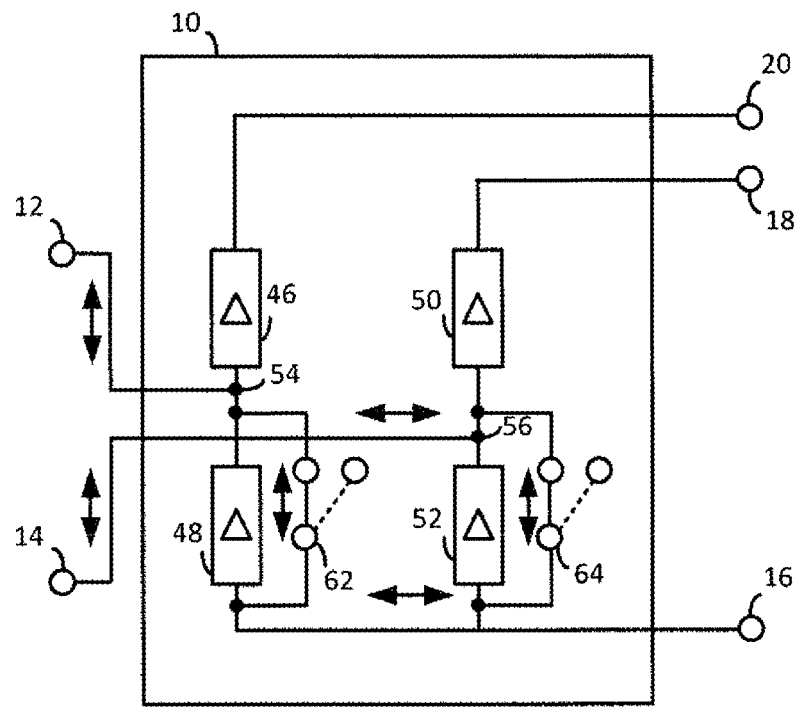
FIG. 12 shows a schematic circuit diagram corresponding to the multiple output rectifier according to the first example of the present invention having functionality to control power delivered to the output terminals.

FIG. 12 shows a schematic circuit diagram corresponding to the multiple output rectifier 10 according to the first example of the present invention having functionality to control power delivered to the output terminals.

As shown in FIG. 12, the multiple output rectifier 10 according to the first example of the present invention preferably comprises a third switching circuit component 62 connected in parallel to the second rectifying circuit component 48 and adapted to selectively bridge the second rectifying circuit component 48.

As shown in FIG. 12, the multiple output rectifier 10 according to the first example of the present invention preferably comprises a fourth switching circuit component 64 connected in parallel to the fourth rectifying circuit component 52 and adapted to selectively bridge the fourth rectifying circuit component 52.

Operatively, the third switching circuit component 62 and the fourth switching circuit component 64 are controlled to simultaneously bridge the second rectifying circuit component 48 and the fourth rectifying circuit component 52 during the first partial period and/or during the second partial period of the AC input signal. This allows to establish a current loop at the input side at the multiple output rectifier 10 according to the first example of the present invention and thus to control power delivery at the output side of the multiple output rectifier 10 according to the first example of the present invention.

Figure 13:
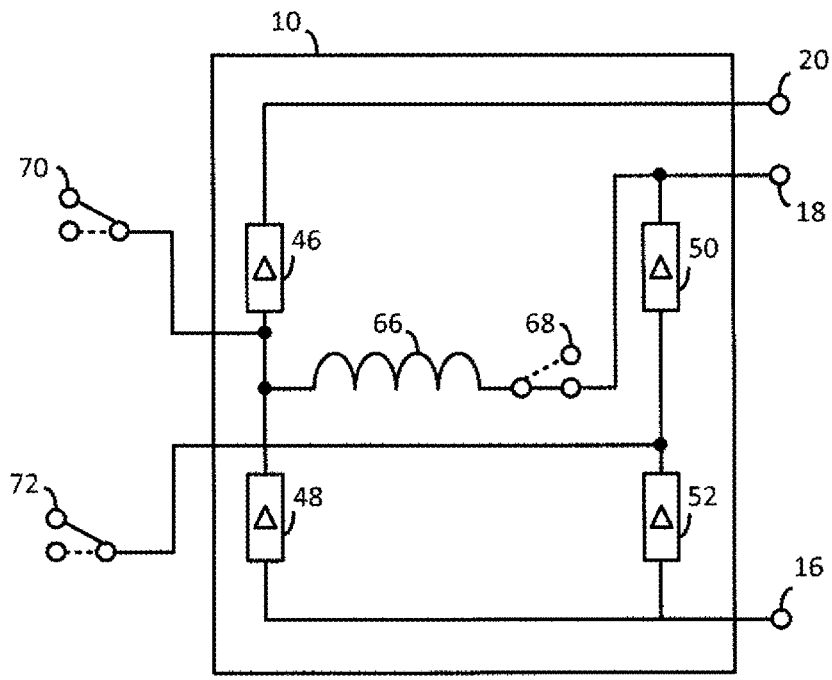
FIG. 13 shows a schematic circuit diagram corresponding to the multiple output rectifier according to the first example of the present invention having functionality to exchange energy from a first energy storage connected to the first output terminal and a first common output terminal to a second energy storage connected to the second output terminal and the first common output terminal and vice versa.

FIG. 13 shows a schematic circuit diagram corresponding to the multiple output rectifier 10 according to the first example of the present invention having functionality to exchange energy from a first energy storage connected to the first output terminal 18 and the first common output terminal 16 to a second energy storage connected to the second output terminal 20 and the first common output terminal 16 and vice versa.

As shown in FIG. 13, the multiple output rectifier 10 according to the first example of the present invention preferably comprises a series connection of a first passive circuit component for energy exchange 66 and an optional fifth switching circuit component 68 for operation during an energy exchange mode of the multiple output rectifier 10 according to the first example of the present invention.

Operatively, the fifth switching circuit component 68 is adapted to connect the passive circuit component 66 between the first intermediate node 54 and the first output terminal 18 during the energy exchange mode.

Operatively, in the energy exchange mode the first rectifying circuit component 46, the second rectifying circuit component 48, the third rectifying circuit component 50, and the fourth rectifying component 52 are realized as active switching circuit components and controlled for operation as four quadrant converter, buck converter or boost converter during the energy exchange mode.

As shown in FIG. 13, preferably the multiple output rectifier 10 according to the first example of the present invention preferably comprises a sixth switching circuit component 70 adapted to selectively disconnect the first input terminal 12 and the multiple output rectifier 10 according to the first example of the present invention during the energy exchange mode. Further, the multiple output rectifier 10 according to the first example of the present invention comprises a seventh switching circuit component 72 adapted to selectively disconnect the second input terminal 14 and the multiple output rectifier 10 according to the first example of the present invention during the energy exchange mode.

Figure 14:
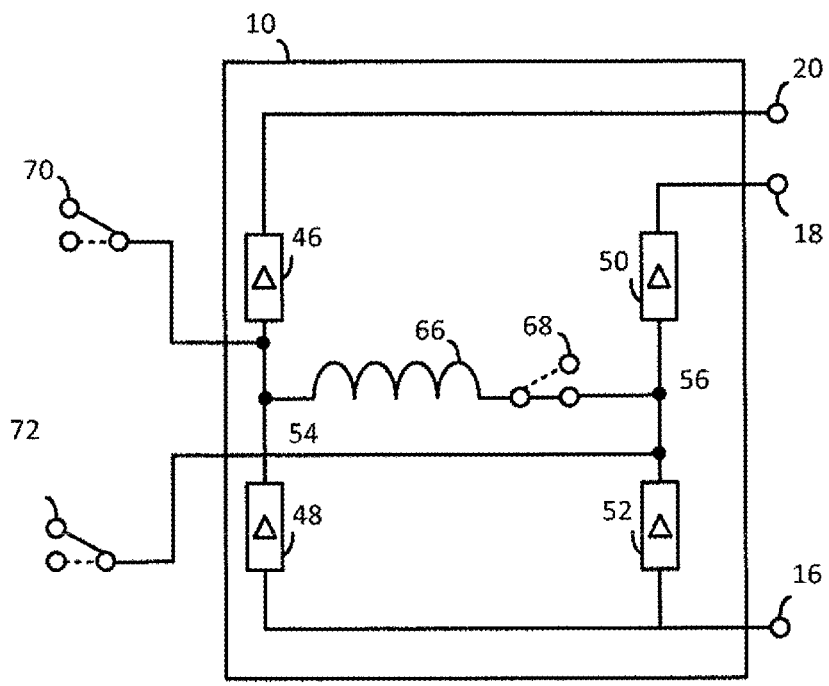
FIG. 14 shows a modified schematic circuit diagram corresponding to the multiple output rectifier according to the first example of the present invention having functionality to exchange energy from a first energy storage connected to the first output terminal and the first common output terminal to a second energy storage connected to the second output terminal and the first common output terminal and vice versa.

FIG. 14 shows a modified schematic circuit diagram corresponding to the multiple output rectifier 10 according to the first example of the present invention having functionality to exchange energy from a first energy storage connected to the first output terminal 18 and the first common output terminal 16 to a second energy storage connected to the second output terminal 20 and the first common output terminal 16 and vice versa.

As shown in FIG. 14, according to the modification the fifth switching circuit component 68 is adapted to connect the passive circuit component 66 between first intermediate node 54 and the second intermediate node 56.

Figure 15:
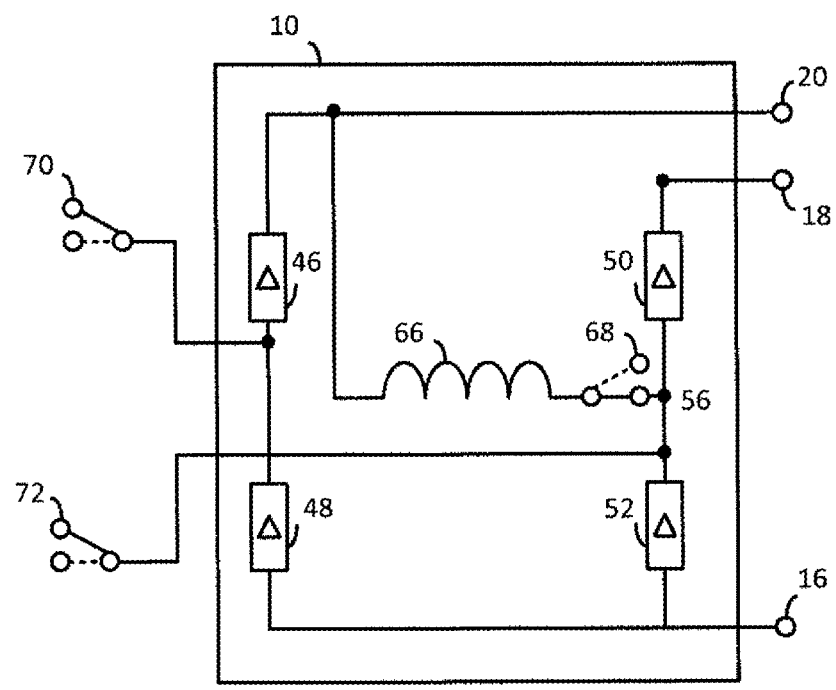
FIG. 15 shows a further modified schematic circuit diagram corresponding to the multiple output rectifier according to the first example of the present invention having functionality to exchange energy from a first energy storage connected to the first output terminal and the first common output terminal to a second energy storage connected to the second output terminal and the first common output terminal and vice versa.

FIG. 15 shows a further modified schematic circuit diagram of the multiple output rectifier 10 according to the first example of the present invention having functionality to exchange energy from a first energy storage connected to the first output terminal and the first common output terminal 16 to a second energy storage connected to the second output terminal and the first common output terminal 16 and vice versa.

A shown in FIG. 15, according to the further modification the fifth switching circuit component 68 is adapted to connect the first passive circuit component 66 between the second intermediate node 56 and the second output terminal 20 during the energy exchange mode.

Figure 16:
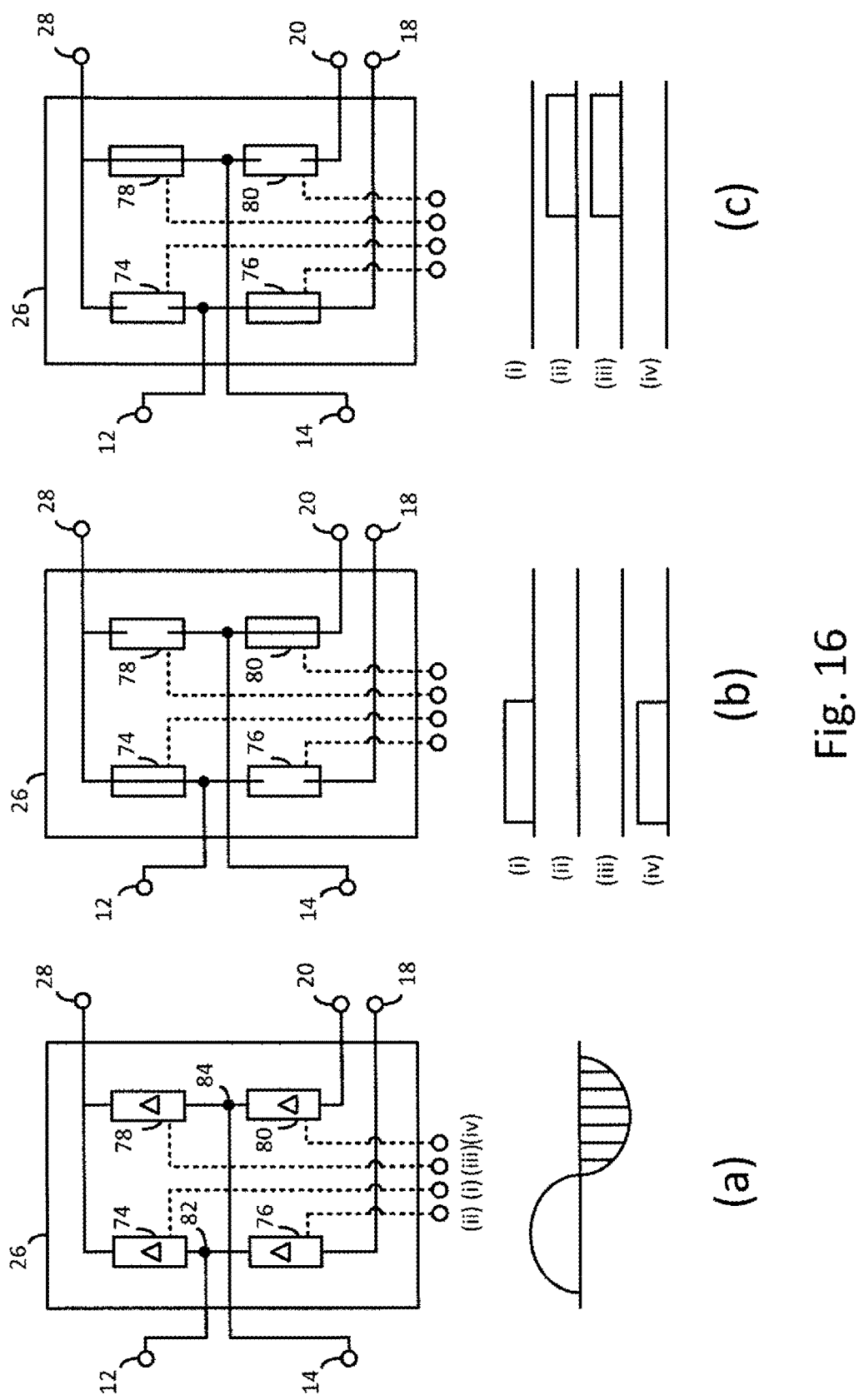
FIG. 16 shows a schematic circuit diagram of the multiple output rectifier according to the second example of the present invention realizing a signal flow as shown in FIG. 8 and FIG. 9.

FIG. 16 shows a schematic circuit diagram of the multiple output rectifier 26 according to a second example of the present invention realizing a signal flow as shown in FIG. 8 and FIG. 9.

As shown in FIG. 16, the multiple output rectifier 26 according to the second example of the present invention comprises a fifth rectifying circuit 74 component adapted to act as current valve in the direction from its input to its output, a sixth rectifying circuit component 76 adapted to act as current valve in the direction from its input to its output, a seventh rectifying circuit component 78 adapted to act as current valve in the direction from its input to its output, and an eighth rectifying circuit component 80 adapted to act as current valve in the direction from its input to its output.

As shown in FIG. 16, the output of the sixth rectifying circuit component 76 is connected in series to the input of the fifth rectifying circuit component 74 forming a third intermediate network node 82. The output of the eighth rectifying circuit component 80 is connected in series to the input of the seventh rectifying circuit component 78 forming a fourth intermediate network node 84.

As shown in FIG. 16, the first input terminal 12 is connected to the third intermediate network node 82. The second input terminal 14 is connected to the fourth intermediate network node 84. The output of the fifth rectifying circuit component 74 is connected to the second common output terminal 28. The output of the seventh rectifying circuit component 78 is connected to the common output terminal 28. The input of the sixth rectifying circuit component 76 is connected to the first output terminal 18. The input of the eighth rectifying circuit component 80 connected to the second output terminal 20.

Operatively, as shown in FIG. 16(b) the multiple output rectifier 26 according to the second example of the present invention configures in the first operative state corresponding to the first partial period of the AC input signal the fifth current path from the first input terminal 12 to the second common output terminal 28 over the fifth rectifying circuit component 74. Also, the sixth current path from the second output terminal 20 to the second input terminal 14 is configured to pass the eighth rectifying circuit component 80.

Further, operatively as shown in FIG. 16(c) during the second partial period of the AC input signal the multiple output rectifier 26 according to the second example of the present invention reverses current flow the to the sixth rectifying circuit component 76 and the seventh rectifying circuit component 78 to establish the seventh current path and the eighth current path explained with respect to FIG. 9.

As shown in FIG. 16, should the rectifying circuit components be active switches than control signals (i), (ii), (iii), and (iv) are applied to the rectifying circuit components, respectively.

Figure 17:
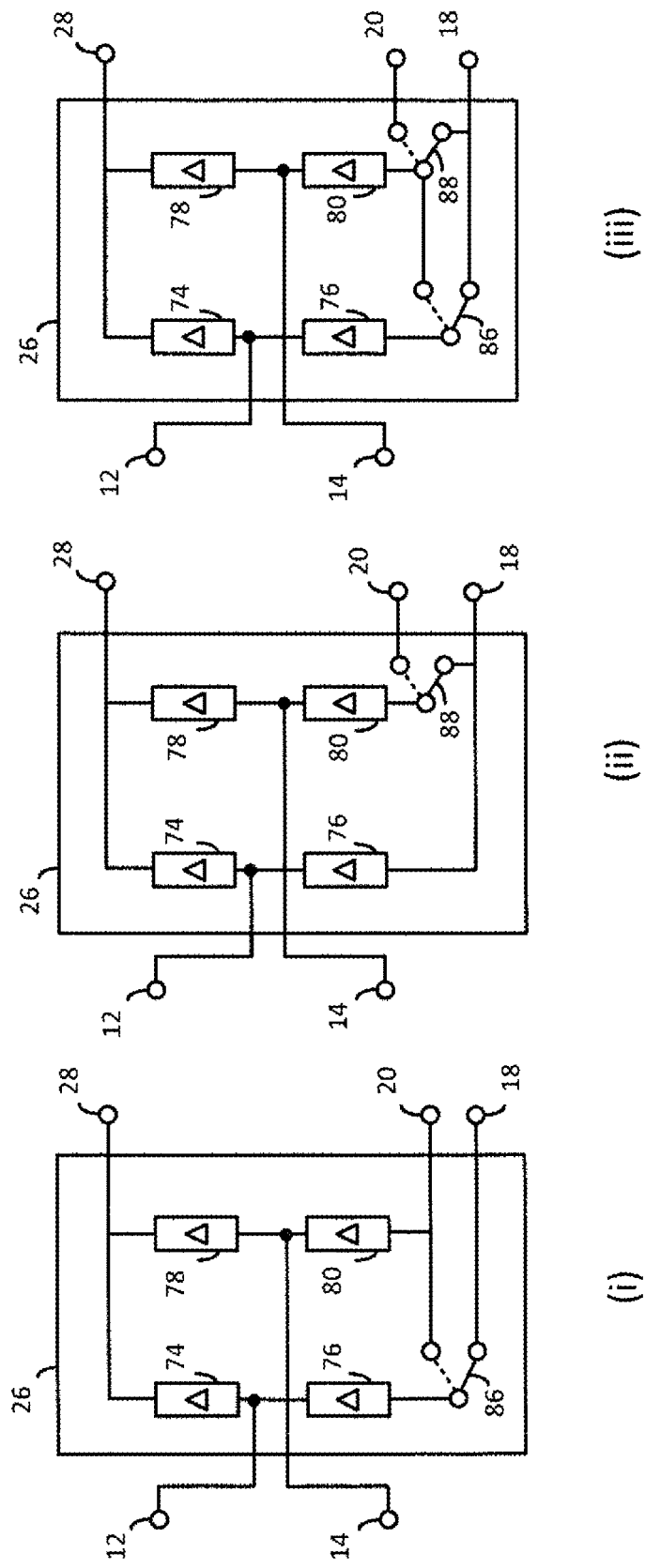
FIG. 17 shows a schematic circuit diagram corresponding to the multiple output rectifier according to the second example of the present invention having functionality to switch between a multiple output rectifying mode and a full bridge rectifying mode.

FIG. 17 shows a schematic circuit diagram corresponding to the multiple output rectifier 26 according to the second example of the present invention having functionality to switch between a multiple output rectifying mode and a full bridge rectifying mode.

As shown in FIG. 17(i), the multiple output rectifier 26 according to the second example of the present invention preferably comprises an eighth switching circuit component 86 adapted to switch a connection between the input of the sixth rectifying circuit component 76 and the second output terminal 20 according to a full bridge operative mode to a connection between the input of the sixth rectifying circuit component 76 and the first output terminal 18 according a multiple output operative mode.

As shown in FIG. 17(ii), the multiple output rectifier 26 according to the second example of the present invention preferably comprises a ninth switching circuit component 88 adapted to switch a connection between the input of the eighth rectifying circuit component 80 and the second output terminal 20 according to a multiple output operative mode to a connection between the input of the eighth rectifying circuit component 80 and the first output terminal 18 according to a full bridge operative mode.

As shown in FIG. 17(iii), the multiple output rectifier 26 according to the second example of the present invention preferably comprises the eighth switching circuit component 86 and the ninth switching circuit component 88 in combination.

Operatively, the different switching constellations lead to the following rectifier constellations:

| Switch 86 | Switch 88 | Functionality |
|---|---|---|
| output terminal 18 input of rectifying circuit component 80 | output terminal 20 output terminal 18 | multiple output full bridge output 18 |
| output terminal 18 input of rectifying circuit component 80 | output terminal 18 output terminal 20 | full bridge output 18 full bridge output 20 |

Figure 18:
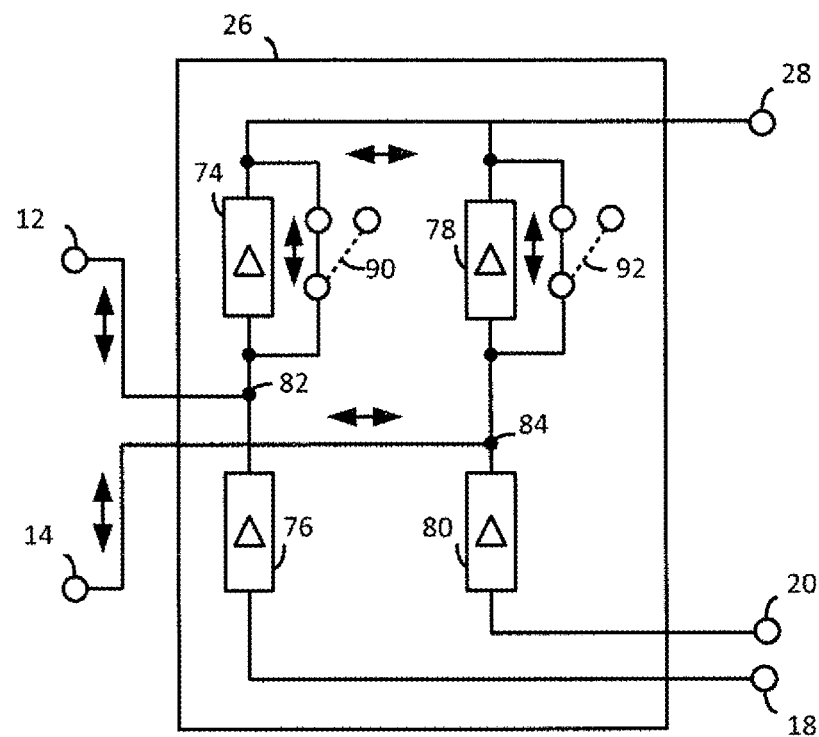
FIG. 18 shows a schematic circuit diagram corresponding to the multiple output rectifier according to the second example of the present invention having functionality to control power delivered to the output terminals.

FIG. 18 shows a schematic circuit diagram corresponding to the multiple output rectifier 26 according to the second example of the present invention having functionality to control power delivered to the output terminals.

As shown in FIG. 18, the multiple output rectifier 26 according to the second example of the present invention preferably comprises a tenth switching circuit component 90 connected in parallel to the fifth rectifying circuit component 74 and adapted to selectively bridge the fifth rectifying circuit component 74.

As shown in FIG. 18, the multiple output rectifier 26 according to the second example of the present invention preferably comprises an eleventh switching circuit component 92 connected in parallel to the seventh rectifying circuit component 78 and adapted to selectively bridge the seventh rectifying circuit component 78.

Operatively, the tenth switching circuit component 90 and the eleventh switching circuit component 92 are controllable to simultaneously bridge the fifth rectifying circuit component 74 and the seventh rectifying circuit component 78 during the first partial period and/or during the second partial period of the AC input signal. This allows to establish a current loop at the input side at the multiple output rectifier 26 according to the second example of the present invention and thus to control power delivery at the output side of the multiple output rectifier 26 according to the second example of the present invention.

Figure 19:
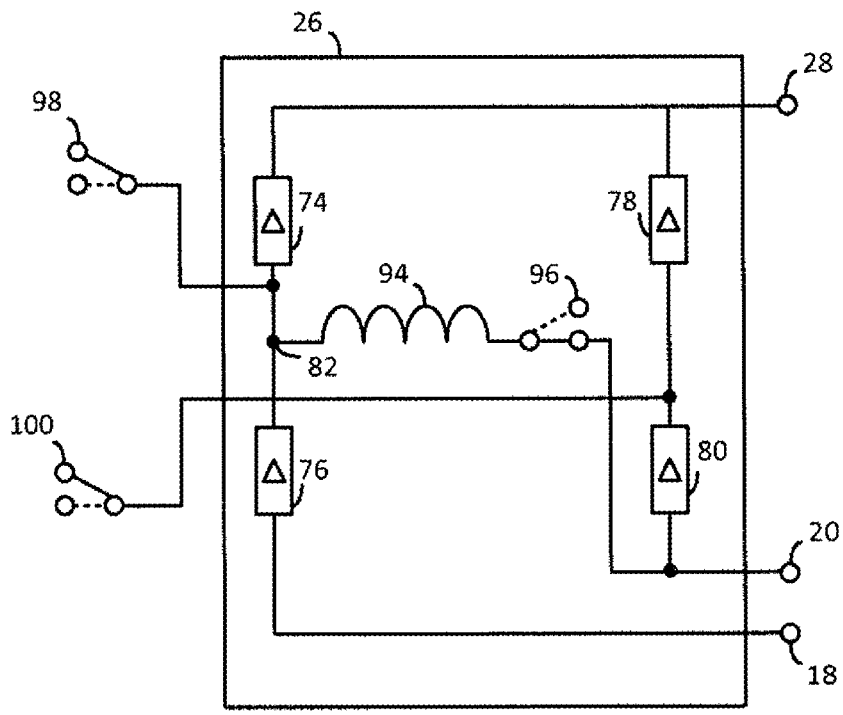
FIG. 19 shows a schematic circuit diagram corresponding to the multiple output rectifier according to the second example of the present invention having functionality to exchange energy from a first energy storage connected to a second common output terminal and the first output terminal to a second energy storage connected to the second common output terminal and the second output terminal and vice versa.

FIG. 19 shows a schematic circuit diagram corresponding to the multiple output rectifier 26 according to the second example of the present invention having functionality to exchange energy from a first energy storage connected to the second common output terminal 28 and the first output terminal 18 to a second energy storage connected to the second common output terminal 28 and the second output terminal 20 and vice versa.

As shown in FIG. 19, the multiple output rectifier 26 according to the second example of the present invention preferably comprises a series connection of a second passive circuit component 94 and a twelfth switching circuit component 96 for operation during an energy exchange mode of the multiple output rectifier 26 according to the second example of the present invention.

As shown in FIG. 19, the twelfth switching circuit component 96 is adapted to connect the second passive circuit component 94 between the third intermediate node 82 and the second output terminal 20 during the energy exchange mode.

Operatively, the fifth rectifying circuit component 74, the sixth rectifying circuit component 76, the seventh rectifying circuit component 78, and the eighth rectifying component 80 are realized as active switching circuit components and controllable to energy exchange operation as four quadrant converter, buck converter or boost converter during the energy exchange mode.

As shown in FIG. 19, the multiple output rectifier 26 according to the second example of the present invention preferably comprises a thirteenth switching circuit component 98 adapted to selectively disconnect the first input terminal 12 and the multiple output rectifier 26 according to the second example of the present invention during the energy exchange mode.

As shown in FIG. 19, the multiple output rectifier 26 according to the second example of the present invention preferably comprises a fourteenth switching circuit component 100 adapted to selectively disconnect the second input terminal 14 and the multiple output rectifier 26 according to the second example of the present invention during the energy exchange mode.

Figure 20:
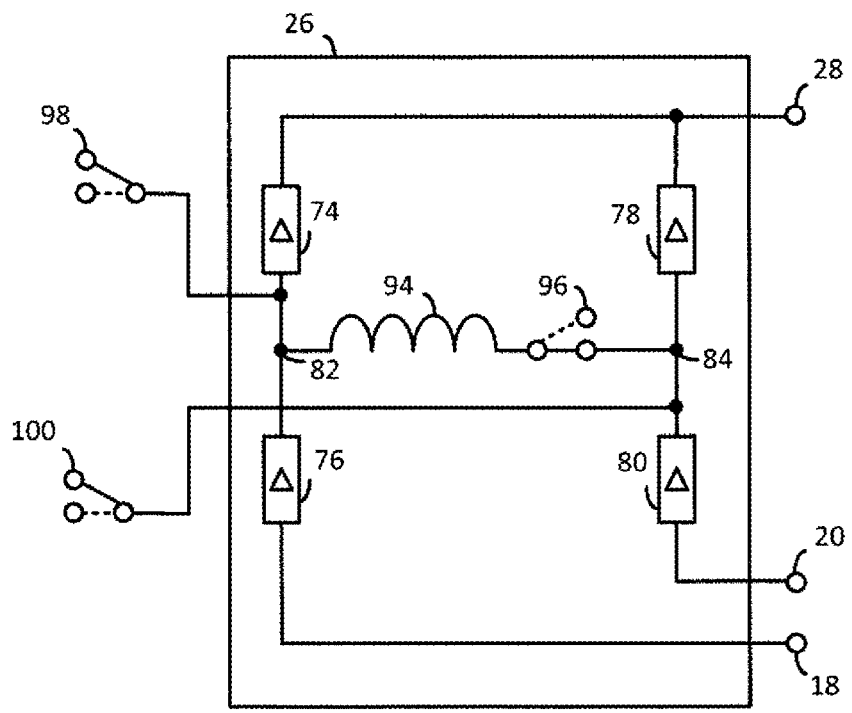
FIG. 20 shows a modified schematic circuit diagram corresponding to the multiple output rectifier according to the second example of the present invention having functionality to exchange energy from a first energy storage connected to the second common output terminal and the first output terminal to a second energy storage connected to the second common output terminal and the second output terminal and vice versa.

FIG. 20 shows a modified schematic circuit diagram corresponding to the multiple output rectifier 26 according to the present invention having functionality to exchange energy from a first energy storage connected to the second common output terminal 28 and the first output terminal 18 to a second energy storage connected to the second common output terminal 28 and the second output terminal 20 and vice versa.

As shown in FIG. 20, according to the modification the twelfth switching circuit component is adapted to connect the passive circuit component 94 between the third intermediate node 82 and the fourth intermediate node 84 during the energy exchange mode.

Figure 21:
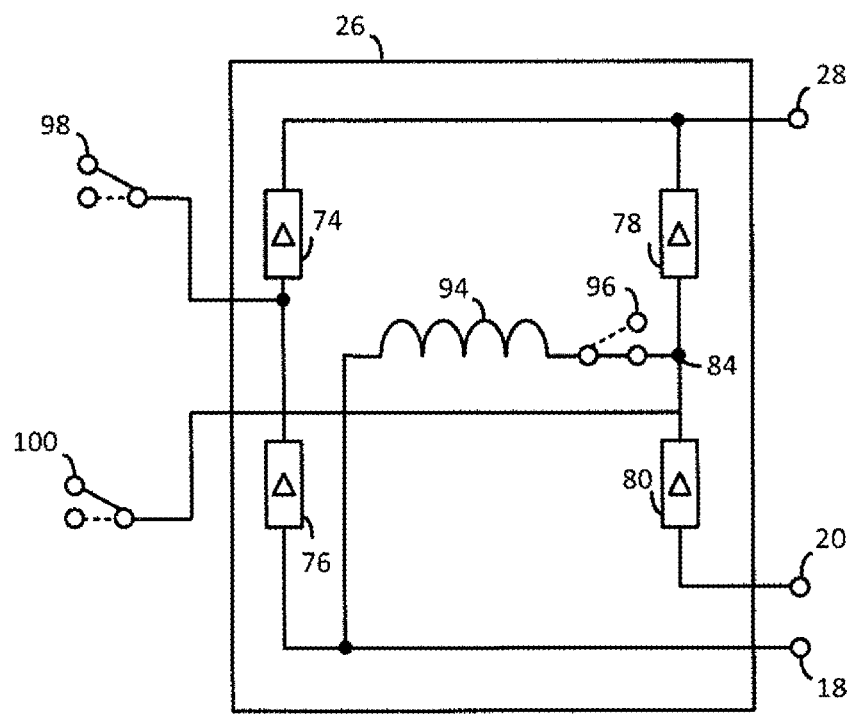
FIG. 21 shows a further modified schematic circuit diagram of the multiple output rectifier according to the second example of the present invention having functionality to exchange energy from a first energy storage connected to the second common output terminal and the first output terminal to a second energy storage connected to the second common output terminal and the second output terminal and vice versa.

FIG. 21 shows a further modified schematic circuit diagram of the multiple output rectifier 26 according to the second example of the present invention having functionality to exchange energy from a first energy storage connected to the second common output terminal 28 and the first output terminal 18 to a second energy storage connected to the second common output terminal and the second output terminal 20 and vice versa.

As shown in FIG. 21, according to the further modification the twelfth switching circuit component 96 is adapted to connect the second passive circuit component 94 between the fourth intermediate node 84 and the first output terminal 18 during the energy exchange mode.

Figure 21A:
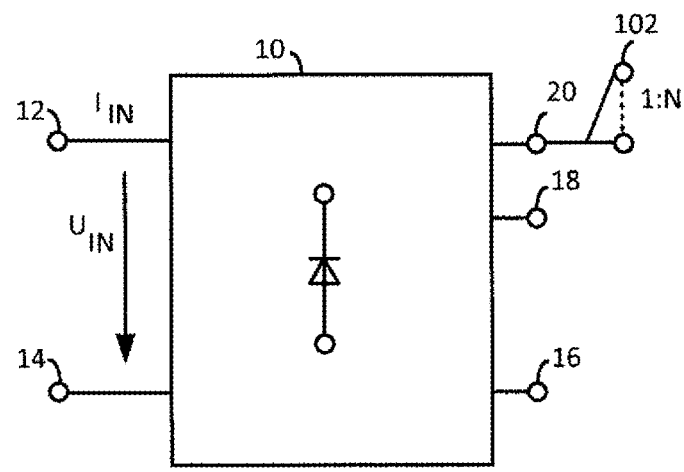
FIG. 21a shows a specific example of the multiple output rectifier according to the first example of the present invention realizing additional switching functionality at the output side of the multiple output rectifier.

FIG. 21a shows a specific example of the multiple output rectifier 10 according to the first example of the present invention realizing additional switching functionality at the output side of the multiple output rectifier 10.

As shown in FIG. 21a, at the second output terminal 20 of the multiple output rectifier 10 there may be provided a 1:N switch 102, wherein N≥2.

Figure 21B:
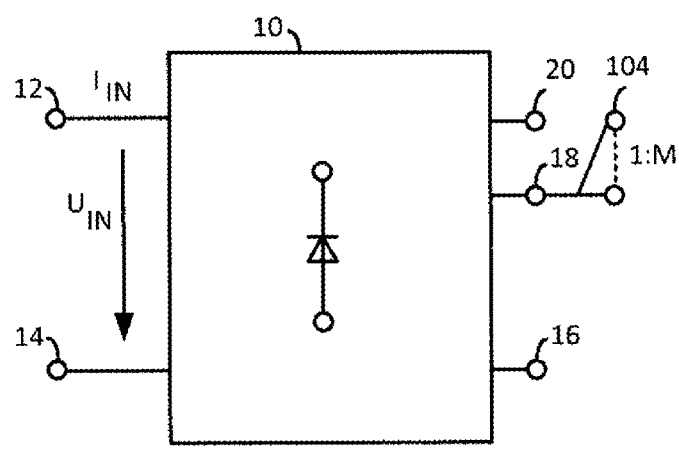
FIG. 21b shows a further specific example of the multiple output rectifier according to the first example of the present invention realizing additional switching functionality at the output side of the multiple output rectifier.

FIG. 21b shows a further specific example of the multiple output rectifier 10 according to the first example of the present invention realizing additional switching functionality at the output side of the multiple output rectifier 10.

As shown in FIG. 21b, at the first output terminal 18 of the multiple output rectifier 10 there may be provided a 1:M switch 104, wherein N≥2.

It should be noted that the 1:M switch 104 shown in FIG. 21b may also be used in combination with the 1:N switch 102 shown in FIG. 21a.

Figure 21C:
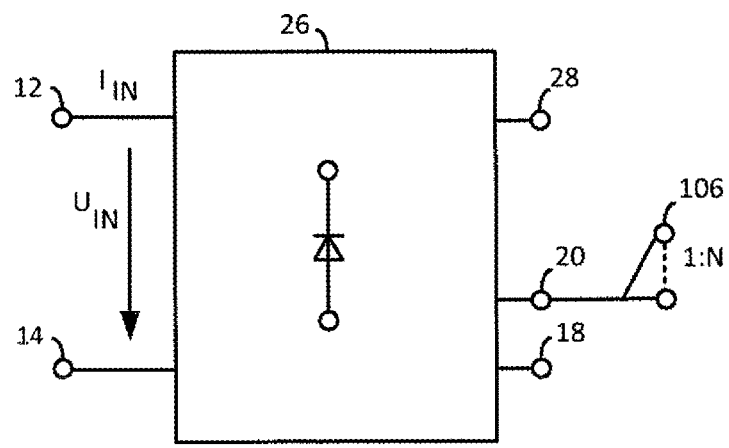
FIG. 21c shows a specific example of the multiple output rectifier according to the second example of the present invention realizing additional switching functionality at the output side of the multiple output rectifier.

FIG. 21c shows a specific example of the multiple output rectifier 26 according to the second example of the present invention realizing additional switching functionality of the output side of the multiple output rectifier 26.

As shown in FIG. 21c, at the second output terminal 20 of the multiple output rectifier 26 there may be provided a 1:N switch 106, wherein N≥2.

Figure 21D:
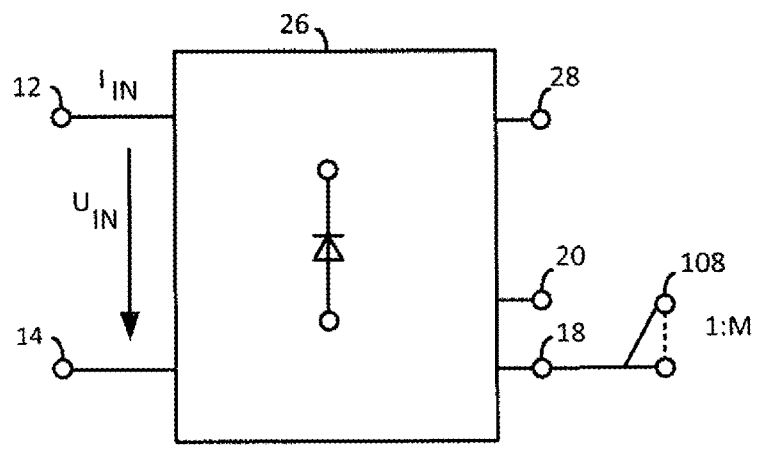
FIG. 21d shows a further specific example of the multiple output rectifier according to the second example of the present invention realizing additional switching functionality at the output side of the multiple output rectifier.

FIG. 21d shows a further specific example of the multiple output rectifier 26 according to the second example of the present invention realizing additional switching functionality at the output side of the multiple output rectifier 26.

As shown in FIG. 21d, at the first output terminal 18 of the multiple output rectifier 26 there may be provided a 1:M switch 108, wherein M≥2.

It should be noted that the 1:M switch 108 shown in FIG. 21d may also be used in combination with the 1:N switch 106 shown in FIG. 21c.

It should be noted that with any of the circuit configurations of the multiple output rectifier 10, 26 as shown in FIGS. 21a to 21d it is possible to increase the flexibility in handling different load scenarios at the output side of the multiple output rectifier 10, 26.

E.g., by using the 1:N switches 102, 106 and/or the 1:M switches 104, 108 it is possible to multiplex different loads at the output side of the multiple output rectifier 10, 26 to either the first output terminal 18 and/or the second output terminal 20.

Further, by appropriately controlling the connection time of different loads to the multiple output rectifier 10, 26 it is possible to control the amount of energy supplied to different loads.

Still further, by applying a plurality of switching schemes—e.g., by using all switching positions in a first state and skipping one or more of the switching positions in a second state—it is possible to support different load topologies in parallel.

Figure 22:
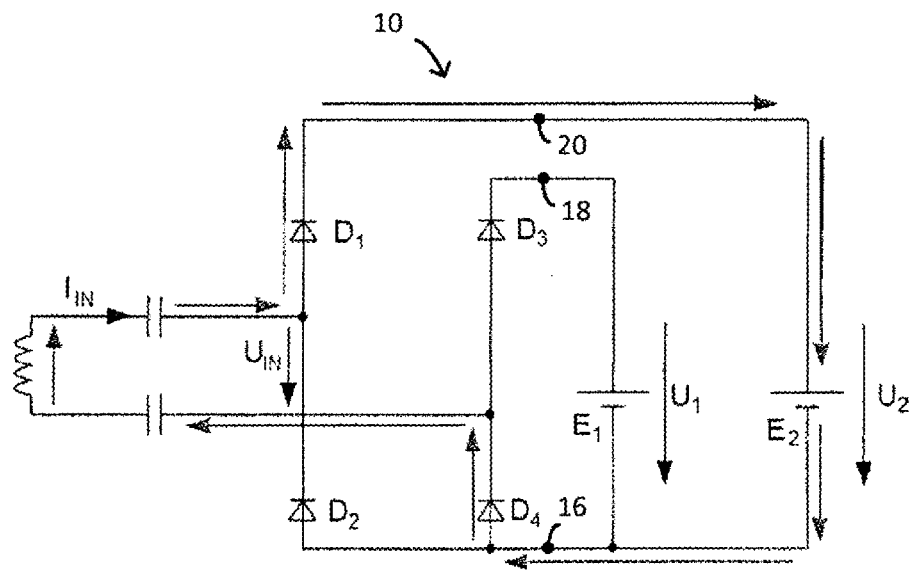
FIG. 22 shows a specific example of the multiple output rectifier according to the first example of the present invention realizing a signal flow as shown in FIG. 5 in an operative state corresponding to the first partial period of the AC input signal.

FIG. 22 shows a specific example of the multiple output rectifier 10 according to the first example of the present invention realizing a signal flow as shown in FIG. 5 and FIG. 6.

As shown in FIG. 22, here the rectifying circuit components are diodes leading to a very cost efficient solution. When the current flows in the forward direction over D1 and D4, diode D2 and D3 are non-conducting. Thus rectifier diodes decouple the first load or energy storage from the second load or energy storage during the different partial periods of the AC input signal.

In more detail, during a positive half wave of AC input signal the first load or energy storage is supplied with energy and the second load or energy storage is decoupled due to D3.

In a series-series compensated wireless power transmission system the secondary side current $I_{IN}$ has the characteristic of a current source if driven at the system's resonant frequency. This means that the fundamental of the secondary side current is independent of the secondary voltage of the rectifier and from the voltages U1, U2 at the loads. This leads to the circumstance that the voltage at the first load and the voltage at the second load can have different levels.

Figure 23:
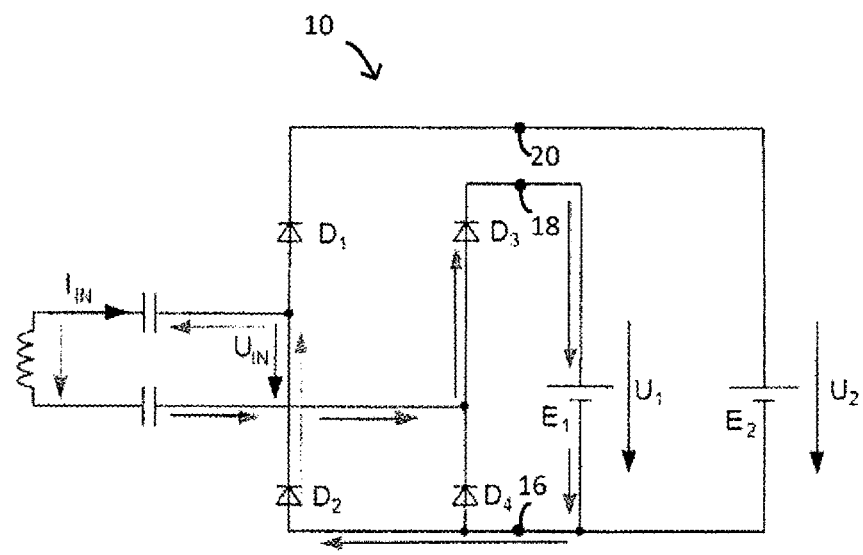
FIG. 23 shows a specific example of the multiple output rectifier according to the first example of the present invention realizing a signal flow as shown in FIG. 6 in an operative state corresponding to the second partial period of the AC input signal.

FIG. 23 shows a specific example of the multiple output rectifier 10 according to the first example of the present invention in an operative state corresponding to the second partial period of the AC input signal.

FIG. 23 relates to the negative half wave of the input signal. As shown in FIG. 23, during the negative half wave the second load or energy storage is supplied with energy and the first load or energy storage is decoupled by the diode D1.

Figure 24:
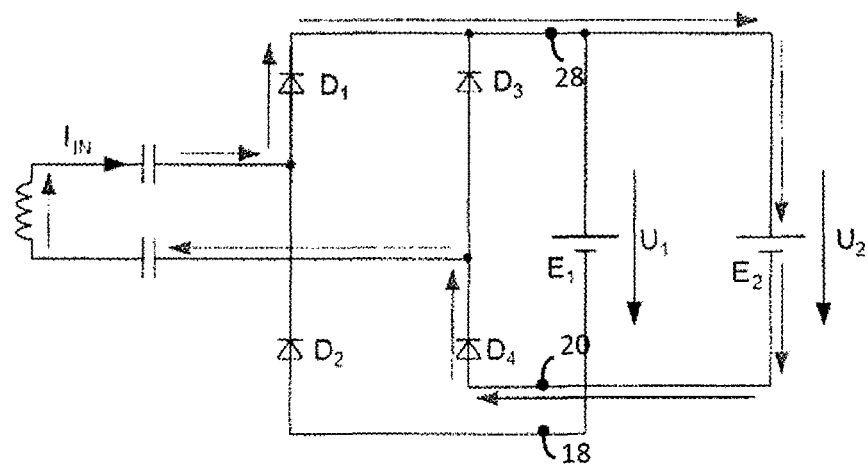
FIG. 24 shows a specific example of the multiple output rectifier according to the second example of the present invention realizing a signal flow as shown in FIG. 8 in an operative state corresponding to the first partial period of the AC input signal.

FIG. 24 shows a specific example of the multiple output rectifier 26 according to the second example of the present invention realizing a signal flow as shown in FIG. 8 and FIG. 9.

As shown in FIG. 24, during the positive half wave energy is supplied to the second load or energy storage along the illustrated path.

Figure 25:
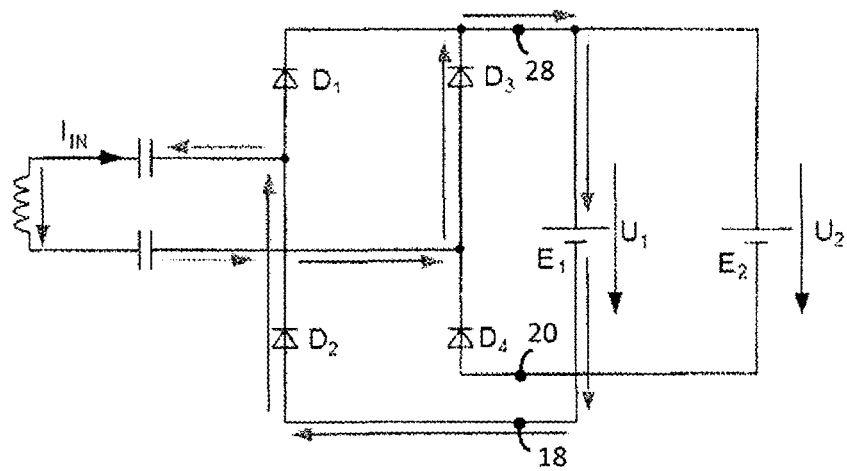
FIG. 25 shows a specific example of the multiple output rectifier according to the second example of the present invention realizing a signal flow as shown in FIG. 9 in an operative state corresponding to the second partial period of the AC input signal.

FIG. 25 shows a specific example of the multiple output rectifier 26 according to the second example of the present invention shown in FIG. 24 in an operative state corresponding to the second partial period of the AC input signal.

As shown in FIG. 25, during the negative half wave energy is supplied to the first load or energy storage along the illustrated path.

Figure 26:
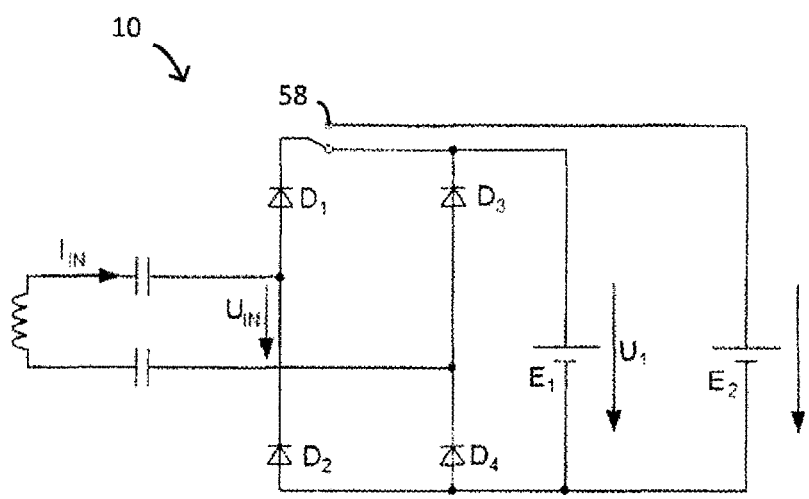
FIG. 26 shows a specific example of the multiple output rectifier according to the first example of the present invention shown in FIG. 11(i) having functionality to switch between a multiple output rectifying mode and a full bridge rectifying mode.

FIG. 26 shows a specific example of the multiple output rectifier according to the first example of the present invention shown in FIG. 11(i) having functionality to switch between a multiple output rectifying mode and a full bridge rectifying mode.

Figure 27:
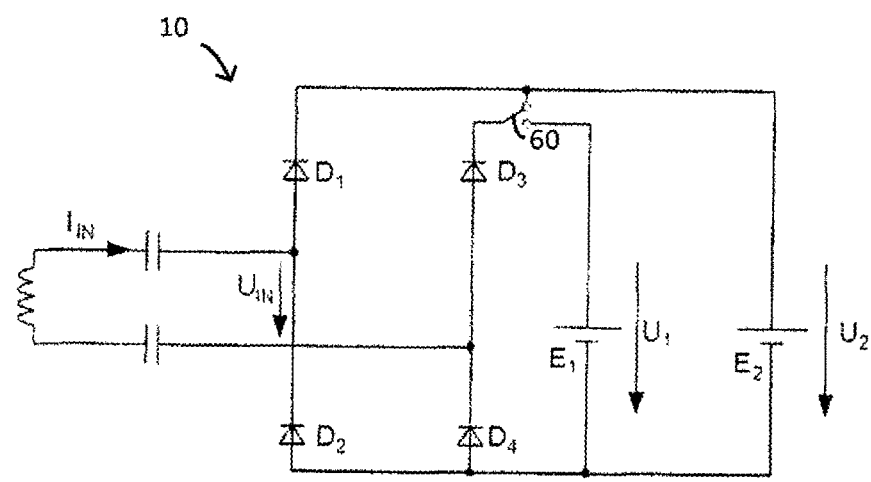
FIG. 27 shows a specific example of the multiple output rectifier according to the first example of the present invention shown in FIG. 11(ii) having functionality to switch between a multiple output rectifying mode and a full bridge rectifying mode.

FIG. 27 shows a specific example of the multiple output rectifier according to the first example of the present invention shown in FIG. 11(ii) having functionality to switch between a multiple output rectifying mode and a full bridge rectifying mode.

Figure 28:
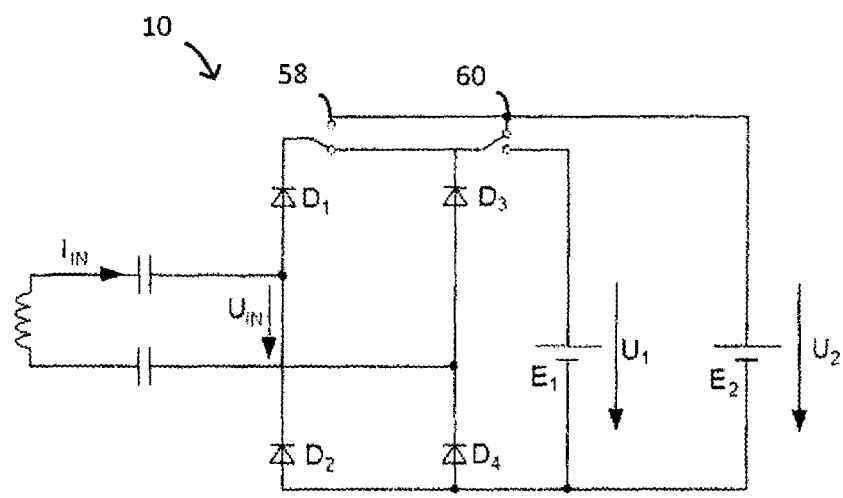
FIG. 28 shows a specific example of the multiple output rectifier according to the first example of the present invention shown in FIG. 11(iii) having functionality to switch between a multiple output rectifying mode and a full bridge rectifying mode.

FIG. 28 shows a specific example of the multiple output rectifier according to the first example of the present invention shown in FIG. 11(iii) having functionality to switch between a multiple output rectifying mode and a full bridge rectifying mode.

Figure 29:
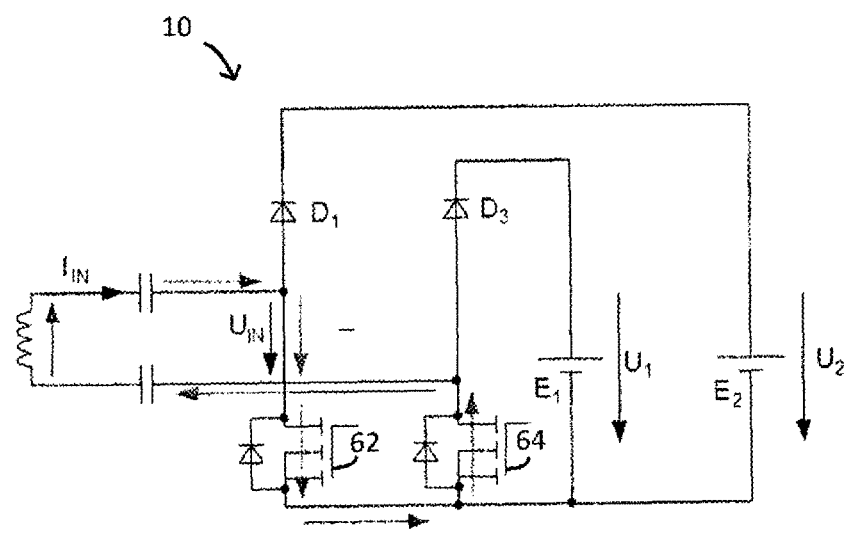
FIG. 29 shows a specific example of the multiple output rectifier according to the first example of the present invention shown in FIG. 12 having functionality to control power delivered to the output terminals in an operative state corresponding to the first partial period of the AC input signal.

FIG. 29 shows a specific example of the multiple output rectifier according to the first example of the present invention shown in FIG. 12 having functionality to control power delivered to the output terminals in an operative state corresponding to the first partial period of the AC input signal.

As shown in FIG. 29, in order to control power according to the present invention, it is suggested to short circuit the positive half wave in order to reduce power delivery to the second load or energy storage.

As shown in FIG. 29, this is achieved by using one or more active switches in place of or parallel to the diodes D1 to D4. Here, during one or more half waves the current is forced to free wheel in the resonant circuit. The power transferred for each load or storage device can thus be controlled individually.

Figure 30:
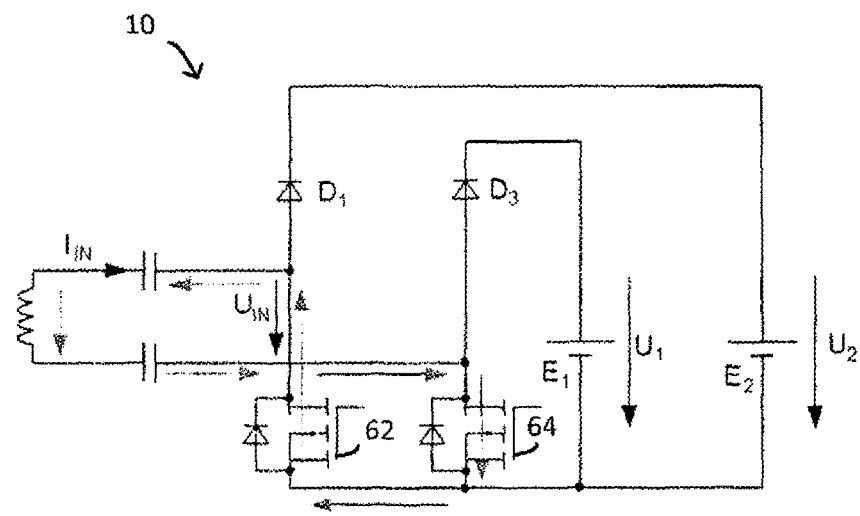
FIG. 30 shows a specific example of the multiple output rectifier according to the first example of the present invention rectifier shown in FIG. 12 having functionality to control power delivered to the output terminals in an operative state corresponding to the second partial period of the AC input signal.

FIG. 30 shows a specific example of the multiple output rectifier 10 according to the first example of the present invention rectifier shown in FIG. 29 in operation during the negative half period.

As shown in FIG. 30, also during the negative half wave of the AC input signal this signal may be short circuited in order to reduce the power delivered to the first load or energy storage.

Figure 31:
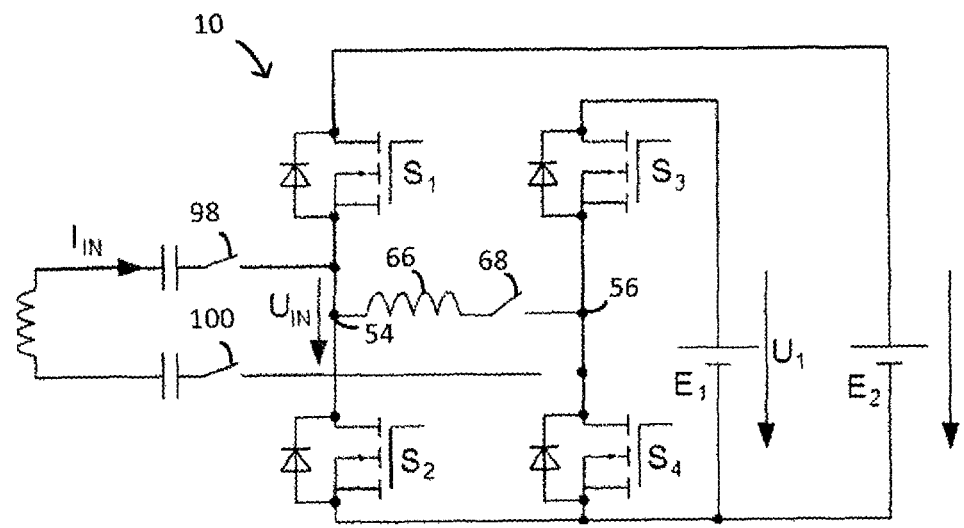
FIG. 31 shows a specific example of the multiple output rectifier according to the first example of the present invention shown in FIG. 14 having functionality to exchange energy from a first energy storage connected to the first output terminal and the first common output terminal to a second energy storage connected to the second output terminal and the common output terminal and vice versa.

FIG. 31 shows a specific example of the multiple output rectifier 10 according to the first example of the present invention having functionality to exchange energy.

As explained above, the active switches are controlled to operate as a 4-quadrant converter, buck converter or booster converter. The additional switches at the input side allow the disconnection of the resonant circuit or receiver coil from the diode or MOSFET-bridge.

Figure 32:
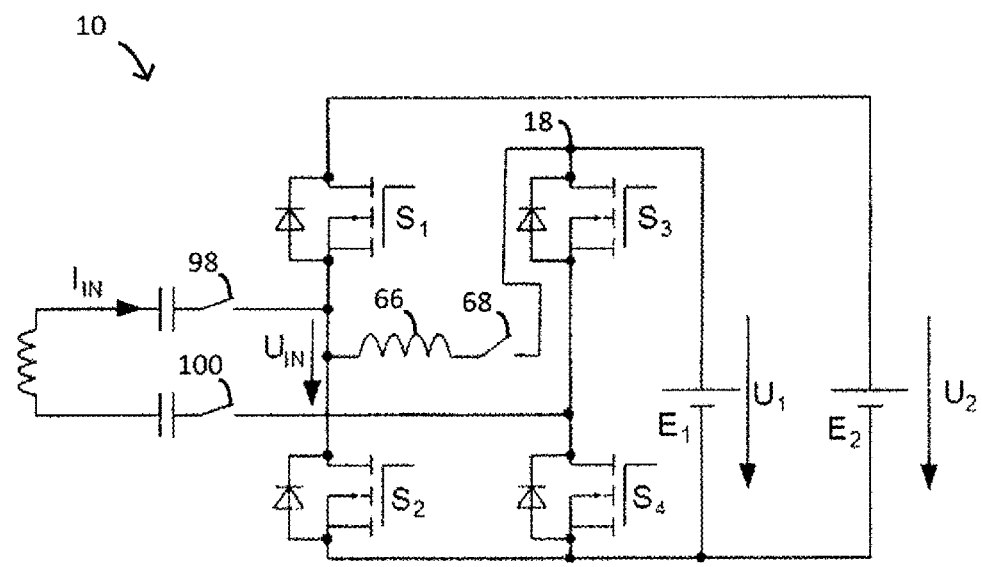
FIG. 32 shows a specific example of the multiple output rectifier according to the first example of the present invention shown in FIG. 13 having functionality to exchange energy from a first energy storage connected to the first output terminal and the first common output terminal to a second energy storage connected to the second output terminal and the common output terminal and vice versa.

FIG. 32 shows a specific example of the multiple output rectifier according to the first example of the present invention having functionality to exchange energy.

The example shown in FIG. 32 differs from the example in FIG. 31 in the connection of the passive circuit component.

The present invention allows for significant improvements. Although it is useful in series-series compensated wireless power transmission systems with two loads or energy storages it is not restricted to this domain. It may be used for any other switched mode power supply with a secondary rectifier structure.

Further, according to the present invention it is possible to individually control the charging current of two independent loads or energy storages with different voltage levels. No additional DC/DC-converter is needed. This save semiconductors, passive components, cost, space, and even leads to a higher efficiency, as no losses occur inside the DC/DC-converter. This also leads to smaller heat sink requirements.

Further, during wireless power transfer both loads or energy storages can be supplied with energy, and without wireless energy supply energy can be exchanged between the two energy storages.

The invention claimed is:

1. Multiple output rectifier for converting an AC input signal into a first rectified output signal and a second rectified output signal, wherein the AC input signal has a fundamental period dividing into a first partial period where an AC current flows in a first direction and a second partial period where the AC current flows in a second direction being a reverse direction to the first direction, and the multiple output rectifier has
   a common output terminal, a first output terminal, and a second output terminal, the common output terminal, the first output terminal, and the second output terminal being decoupled from each other; wherein in a multiple output operative mode;
   during the first partial period the multiple output rectifier is adapted to maintain polarity of the AC input signal and to transfer it to the second output terminal and the common output terminal as the first rectified output signal; and
   during the second partial period the multiple output rectifier is adapted to reverse polarity of the AC input signal and to transfer it to the first output terminal and the common output terminal as the second rectified output signal;
   wherein in the multiple operative mode
   during the first partial period the multiple output rectifier is adapted to establish a first current path from the first input terminal to the second output terminal and to establish a second current path from the common output terminal to the second input terminal for output of the first rectified output signal from the second output terminal to the common output terminal; and
   during the second partial period the multiple output rectifier is adapted to establish a third current path from the second input terminal to the first output terminal and to establish a fourth current path from the common output terminal to the first input terminal for output of the second rectified output signal from the first output terminal to the common output terminal;
   and further comprising
   a first rectifying circuit component adapted to act as current valve in the direction from its input to its output;

a second rectifying circuit component adapted to act as current valve in the direction from its input to its output;
a third rectifying circuit element component to act as current valve in the direction from its input to its output;
a fourth rectifying circuit component adapted to act as current valve in the direction from its input to its output; wherein
the output of the second rectifying circuit component is connected in series to the input of the first rectifying circuit component forming a first intermediate network node there between;
the output of the fourth rectifying circuit component is connected in series to the input of the third rectifying circuit component forming a second intermediate network node there between;
the first input terminal is connected to the first intermediate network node;
the second input terminal is connected to the second intermediate network node;
the output of the first rectifying circuit component is connected to the second output terminal;
the output of the third rectifying circuit component is connected to the first output terminal;
the input of the second rectifying circuit component is connected to the common output terminal; and
the input of the fourth rectifying circuit component is connected to the common output terminal.

2. The multiple output rectifier according to claim 1, comprising:
a first switching circuit component provided at the first output terminal or at the second output terminal and adapted to change the operative mode of the multiple output rectifier from the multiple output operative mode to a full bridge operative mode and vice versa.

3. The multiple output rectifier according to claim 2, comprising:
a third switching circuit component connected in parallel to the second rectifying circuit component and adapted to selectively bridge the second rectifying circuit component;
a fourth switching circuit component connected in parallel to the fourth rectifying circuit component and adapted to selectively bridge the fourth rectifying circuit component; wherein
the third switching circuit component and the fourth switching circuit component are controllable to simultaneously bridge the second rectifying circuit component and the fourth rectifying circuit component during the first partial period and/or during the second partial period of the AC input signal.

4. The multiple output rectifier according to claim 2, comprising:
a series connection of a first passive circuit component for energy exchange and an optional fifth switching circuit component for operation during an energy exchange mode of the multiple output rectifier; wherein
the fifth switching circuit component is adapted to connect the passive circuit component between the first intermediate node and the first output terminal, or between the first intermediate node and the second intermediate node terminal, or between the second intermediate node and the first output terminal during the energy exchange mode; and
the first rectifying circuit component, the second rectifying circuit component, the third rectifying circuit component, and the fourth rectifying component are realized as active switching circuit components and controllable for operation as four quadrant converter, buck converter or boost converter during the energy exchange mode.

5. The multiple output rectifier according to claim 4, comprising:
a sixth switching circuit component adapted to selectively disconnect the first input terminal and the multiple output rectifier during the energy exchange mode; and
a seventh switching circuit component adapted to selectively disconnect the second input terminal and the multiple output rectifier during the energy exchange mode.

6. The multiple output rectifier according to claim 1, wherein
the first switching circuit component is adapted to switch a connection between the output of the first rectifying circuit component and the second output terminal according to a multiple output operative mode to a connection between the output of the first rectifying circuit component and the first output terminal according a full bridge operative mode.

7. The multiple output rectifier according to claim 1, comprising:
a second switching circuit component adapted to switch a connection between the output of the third rectifying circuit component and the second output terminal according to a full bridge operative mode to a connection between the output of the third rectifying circuit component and the first output terminal according to a multiple output operative mode.

8. The multiple output rectifier according to claim 1, comprising:
a 1:M switch connected to the first output terminal of the multiple output rectifier, wherein M≥2; and/or
a 1:N switch connected to the second output terminal of the multiple output rectifier, wherein N≥2.

9. Multiple output rectifier for converting an AC input signal into a first rectified output signal and a second rectified output signal, wherein the AC input signal has a fundamental period dividing into a first partial period where an AC current flows in a first direction and a second partial period where the AC current flows in a second direction being a reverse direction to the first direction, and the multiple output rectifier has
a common output terminal, a first output terminal, and a second output terminal, the common output terminal, the first output terminal, and the second output terminal being decoupled from each other; wherein in a multiple output operative mode
during the first partial period the multiple output rectifier is adapted to maintain polarity of the AC input signal and to transfer it to the second output terminal and the common output terminal as the first rectified output signal;
during the second partial period the multiple output rectifier is adapted to reverse polarity of the AC input signal and to transfer it to the first output terminal and the common output terminal as the second rectified output signal;
during the first partial period the multiple output rectifier is adapted to establish a fifth current path from the first input terminal to the common output terminal and to establish a sixth current path from the second output terminal to the second input terminal for output of the first rectified output signal from the common output terminal to the second output terminal;

during the second partial period the multiple output rectifier is adapted to establish a seventh current path from the second input terminal to the common output terminal and to establish an eighth current path from the first output terminal to the first input terminal for output of the second rectified output signal from the common output terminal to the first output terminal;

a fifth rectifying circuit component adapted to act as current valve in the direction from its input to its output;

a sixth rectifying circuit component adapted to act as current valve in the direction from its input to its output;

a seventh rectifying circuit component adapted to act as current valve in the direction from its input to its output;

an eighth rectifying circuit component adapted to act as current valve in the direction from its input to its output; wherein the output of the sixth rectifying circuit component is connected in series to the input of the fifth rectifying circuit component forming a third intermediate network node there between;

the output of the eighth rectifying circuit component is connected in series to the input of the seventh rectifying circuit component forming a fourth intermediate network node there between;

the first input terminal is connected to the third intermediate network node;

the second input terminal is connected to the fourth intermediate network node;

the output of the fifth rectifying circuit component is connected to the common output terminal;

the output of the seventh rectifying circuit component is connected to the common output terminal;

the input of the sixth rectifying circuit component is connected to the first output terminal; and the input of the eighth rectifying circuit component connected to the second output terminal.

10. The multiple output rectifier according to claim 9, comprising:

an eighth switching circuit component provided at the first output terminal or at the second output terminal and adapted to change the operative mode of the multiple output rectifier from the multiple output operative mode to a full bridge operative mode and vice versa.

11. The multiple output rectifier according to claim 9, wherein:

the eighth switching circuit component is adapted to switch a connection between the input of the sixth rectifying circuit component and the second output terminal according to a full bridge operative mode to a connection between the input of the sixth rectifying circuit component and the first output terminal according a multiple output operative mode.

12. The multiple output rectifier according to claim 9, comprising:

a ninth switching circuit component adapted to switch a connection between the input of the eighth rectifying circuit component and the second output terminal according to a multiple output operative mode to a connection between the input of the eighth rectifying circuit component and the first output terminal according to a full bridge operative mode.

13. The multiple output rectifier according to claim 9, comprising:

a tenth switching circuit component connected in parallel to the fifth rectifying circuit component and adapted to selectively bridge the fifth rectifying circuit component;

an eleventh switching circuit component connected in parallel to the seventh rectifying circuit component and adapted to selectively bridge the seventh rectifying circuit component; wherein the tenth switching circuit component and the eleventh switching circuit component are controllable to simultaneously bridge the fifth rectifying circuit component and the seventh rectifying circuit component during the first partial period and/or during the second partial period of the AC input signal.

14. The multiple output rectifier according to claim 9, comprising:

a series connection of a second passive circuit component and a twelfth optional switching circuit component for operation during an energy exchange mode of the multiple output rectifier; wherein the twelfth switching circuit component is adapted to connect the second passive circuit component between the third intermediate node and the first output terminal, between the third intermediate node and the fourth intermediate node, or between the fourth intermediate node and the second output terminal during the energy exchange mode; and the fifth rectifying circuit component, the sixth rectifying circuit component, the seventh rectifying circuit component, and the eighth rectifying component are realized as active switching circuit components and controllable to energy exchange operation as four quadrant converter, buck converter or boost converter during the energy exchange mode.

15. The multiple output rectifier according to claim 14, comprising:

a thirteenth switching circuit component adapted to selectively disconnect the first input terminal and the multiple output rectifier during the energy exchange mode; and a fourteenth switching circuit component adapted to selectively disconnect the second input terminal and the multiple output rectifier during the energy exchange mode.

* * * * *